(12) United States Patent
Chang et al.

(10) Patent No.: US 12,032,930 B2
(45) Date of Patent: *Jul. 9, 2024

(54) METHOD, SYSTEM AND NON-TRANSITORY COMPUTER-READABLE STORAGE MEDIUM FOR GENERATING DESCRIPTION CODE OF USER INTERFACE

(71) Applicant: Miracle Mobile Co. Ltd., Taipei (TW)

(72) Inventors: Chien-Chuan Chang, Taipei (TW); So-Fong Hsieh, Taipei (TW)

(73) Assignee: MIRACLE MOBILE CO. LTD., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/199,994

(22) Filed: May 22, 2023

(65) Prior Publication Data

US 2023/0289152 A1  Sep. 14, 2023

Related U.S. Application Data

(63) Continuation of application No. 17/320,411, filed on May 14, 2021, now Pat. No. 11,704,097.

(30) Foreign Application Priority Data

Aug. 24, 2020  (TW) ................................. 109128815

(51) Int. Cl.
*G06F 3/0482* (2013.01)
*G06F 3/04845* (2022.01)
*G06F 8/38* (2018.01)

(52) U.S. Cl.
CPC .............. *G06F 8/38* (2013.01); *G06F 3/0482* (2013.01); *G06F 3/04845* (2013.01)

(58) Field of Classification Search
CPC ...... G06F 8/38; G06F 3/0482; G06F 3/04845; G06F 3/0484; G06F 3/04847
See application file for complete search history.

(56) References Cited

U.S. PATENT DOCUMENTS

| | | | |
|---|---|---|---|
| 7,362,311 B2* | 4/2008 | Filner | G06F 16/9577 345/169 |
| 2005/0111745 A1* | 5/2005 | Kato | G06F 18/40 382/243 |

(Continued)

*Primary Examiner* — Jennifer N Welch
*Assistant Examiner* — Ashley M Fortino
(74) *Attorney, Agent, or Firm* — WPAT, P.C

(57) ABSTRACT

This disclosure discloses a method and a system for generating a description code of a user interface, and the method includes the steps of displaying a programmable user interface having a first object and a second object; grouping the first object and the second object to form a grouping block; cutting the grouping block into a first sub-block and a second sub-block; setting a first interval between the first object and the second object as having a first display attribute or a second display attribute; displaying a first attribute element; detecting whether the first attribute element is selected; when the first attribute element is detected as selected, switching the first interval between having the first display attribute and having the second display attribute; and generating a first description code corresponding to the first object and the second object according to the first display attribute or the second display attribute.

16 Claims, 22 Drawing Sheets

(56) References Cited

U.S. PATENT DOCUMENTS

2011/0179238 A1* 7/2011 Hosoya ............... G06F 3/0683
                                                            711/E12.001
2011/0310403 A1* 12/2011 Morita ................. H04N 1/393
                                                            358/1.2

* cited by examiner

METHOD, SYSTEM AND NON-TRANSITORY COMPUTER-READABLE STORAGE MEDIUM FOR GENERATING DESCRIPTION CODE OF USER INTERFACE

CROSS-REFERENCE TO RELATED APPLICATION

This application is a continuation of U.S. application Ser. No. 17/320,411, filed on May 14, 2021, and claims priority to Taiwan application No. Ser. 109128815, filed on Aug. 24, 2020, the disclosure of which is hereby incorporated by reference herein in its entirety.

FIELD

The present disclosure relates to a method for generating codes, in particular to a method and a related non-transitory computer-readable storage media for generating a description code of a user interface.

BACKGROUND

With the prevalence of the Internet and the rapid development of mobile communication technology, Internet-enabled computer devices have become indispensable auxiliary devices in modern people's work or life. At present, various Internet-enabled computer devices available on the market include desktop computers, notebook computers, tablet computers and smart phones. However, since those computer devices have displays with different sizes and resolutions, developers of web pages or applications (APP) must design various versions of user interfaces for the same web page or the same application (APP), so that the user interface of the same web page or the same application (APP) can be optimally displayed on the displays with different sizes or resolutions. Therefore, it is necessary to provide a method for assisting designers of web pages or applications (APP) to conveniently edit and set parameters of objects on a user interface, and to quickly obtain program codes of the edited and set user interface.

SUMMARY

Accordingly, the present disclosure provides a method for generating a description code of a user interface. The method includes: displaying a programmable user interface having a first object and a second object; grouping the first object and the second object to form a grouping block, wherein the first object and the second object are in the grouping block; cutting the grouping block into a first sub-block and a second sub-block, wherein the first object is in the first sub-block and the second object is in the second sub-block; setting a first interval between the first object and the second object as having a first display attribute or a second display attribute; displaying a first attribute element together with the first object and the second object on the programmable user interface, wherein the first attribute element presents a first display state for representing the first display attribute or presents a second display state for representing the second display attribute; detecting whether the first attribute element displayed on the programmable user interface is selected; when the first attribute element displayed on the programmable user interface is detected as selected, switching the first interval between having the first display attribute and having the second display attribute and switching the first attribute element between presenting the first display state and presenting the second display state; and generating a first description code corresponding to the first object and the second object according to the first display attribute or the second display attribute after switching the first interval between having the first display attribute and having the second display attribute and after switching the first attribute element between presenting the first display state and presenting the second display state, wherein: the first object and the second object are arranged in a same row when the first interval has the first display attribute and a first display displaying the programmable user interface has a first width; the first object and the second object are arranged in different rows when the first interval has the second display attribute and a second display displaying the programmable user interface has a second width; and the second width is smaller than the first width.

The present disclosure further provides a system for generating a description code of a user interface. The system includes: a display module configured to display a programmable user interface having a first object and a second object; a grouping module configured to group the first object and the second object to form a grouping block, wherein the first object and the second object are in the grouping block; a cutting module configured to cut the grouping block into a first sub-block and a second sub-block, wherein the first object is in the first sub-block and the second object is in the second sub-block; a setting module configured to set a first interval between the first object and the second object as having a first display attribute or a second display attribute, wherein the display module is further configured to display a first attribute element together with the first object and the second object on the programmable user interface, wherein the first attribute element presents a first display state for representing the first display attribute or presents a second display state for representing the second display attribute; a first detection module configured to detect whether the first attribute element displayed on the programmable user interface is selected, wherein when the first detection module detects that the first attribute element displayed on the programmable user interface is selected, the first interval is switched between having the first display attribute and having the second display attribute, and the first attribute element is switched between presenting the first display state and presenting the second display state; a description code generation module configured to generate a first description code corresponding to the first object and the second object according to the first display attribute or the second display attribute after the first interval is switched between having the first display attribute and having the second display attribute and after the first attribute element is switched between presenting the first display state and presenting the second display state, wherein: the first object and the second object are arranged in a same row when the first interval has the first display attribute and a first display displaying the programmable user interface has a first width; the first object and the second object are arranged in different rows when the first interval has the second display attribute and a second display displaying the programmable user interface has a second width; and the second width is smaller than the first width.

The present disclosure further provides a non-transitory computer-readable storage medium for storing at least one program including a plurality of instructions that, when executed by at least one computer, generates a plurality of operations. The plurality of operations includes: displaying a programmable user interface having a first object and a second object; grouping the first object and the second object to form a grouping block, wherein the first object and the second object are in the grouping block; cutting the grouping block into a first sub-block and a second sub-block, wherein the first object is in the first sub-block and the second object is in the second sub-block; setting a first interval between the first object and the second object as having a first display attribute or a second display attribute; displaying a first attribute element together with the first object and the second object on the programmable user interface, wherein the first attribute element presents a first display state for representing the first display attribute or presents a second display state for representing the second display attribute; detecting whether the first attribute element displayed on the programmable user interface is selected; when the first attribute element displayed on the programmable user interface is detected as selected, switching the first interval between having the first display attribute and having the second display attribute and switching the first attribute element between presenting the first display state and presenting the second display state; and generating a first description code corresponding to the first object and the second object according to the first display attribute or the second display attribute after switching the first interval between having the first display attribute and having the second display attribute and after switching the first attribute element between presenting the first display state and presenting the second display state, wherein: the first object and the second object are arranged in a same row when the first interval has the first display attribute and a first display displaying the programmable user interface has a first width; the first object and the second object are arranged in different rows when the first interval has the second display attribute and a second display displaying the programmable user interface has a second width; and the second width is smaller than the first width.

By using the method and the system for generating a description code of a user interface disclosed in the present disclosure, a designer of a web page or an application (APP) can quickly edit and set the display attributes of object on a user interface, and can obtain the program code of the designed user interface immediately after completing the task of editing and setting, thus effectively saving the time for writing the program code.

DETAILED DESCRIPTION OF THE PREFERRED EMBODIMENTS

A method, a system, and a non-transitory computer-readable storage medium for generating a description code of a user interface according to embodiments of the present disclosure are described below. However, the embodiments provided in the present disclosure are merely illustrative of examples of the method, the system, and the non-transitory computer-readable storage medium for generating a description code of a user interface of the present disclosure. The embodiments provided in the present disclosure are not intended to limit the scope of the present disclosure.

Figure 1:
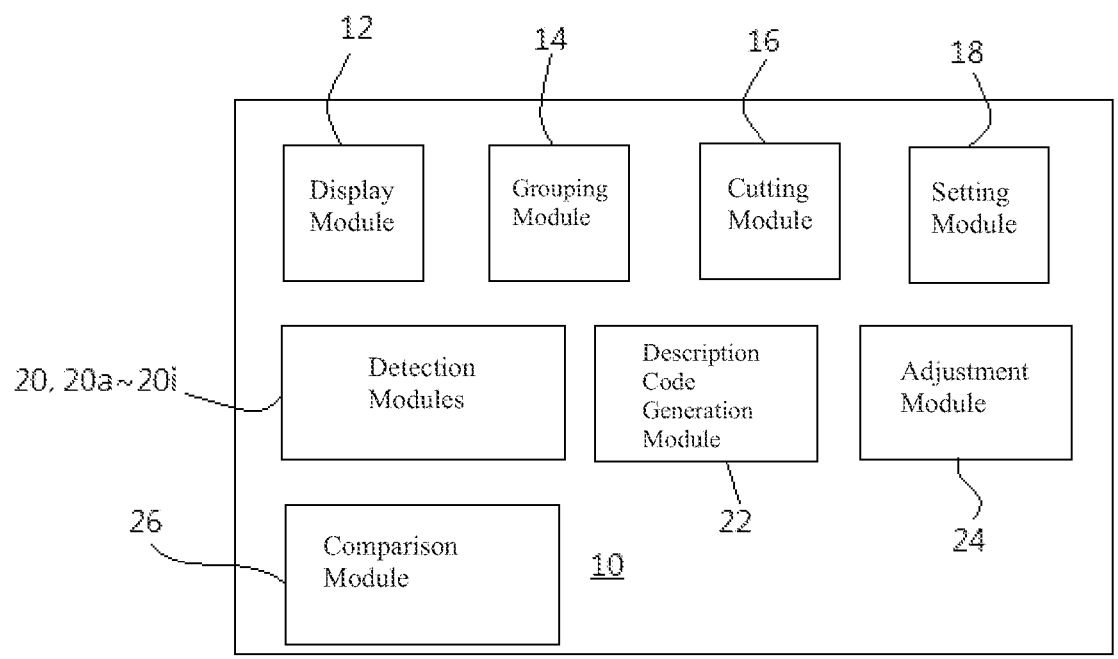
FIG. 1 is a schematic diagram of a system for generating a description code of a user interface according to an embodiment of the present disclosure.

FIG. 1 is a schematic diagram of a system 10 for generating a description code of a user interface according to an embodiment of the present disclosure. The system 10 may be implemented in a computer and includes a display module 12, a grouping module 14, a cutting module 16, a setting module 18, a plurality of detection modules 20, a description code generation module 22, an adjustment module 24, and a comparison module 26. In this embodiment, the display module 12, the grouping module 14, the cutting module 16, the setting module 18, the plurality of detection modules 20, the description code generation module 22, the adjustment module 24 and the comparison module 26 may be implemented by different software modules or different program codes, respectively, and executed by the computer. In other embodiments, the display module 12, the grouping module 14, the cutting module 16, the setting module 18, the plurality of detection modules 20, the description code generation module 22, the adjustment module 24, and the comparison module 26 may also be implemented in the computer by software combined with hardware or firmware, respectively.

Figure 2:
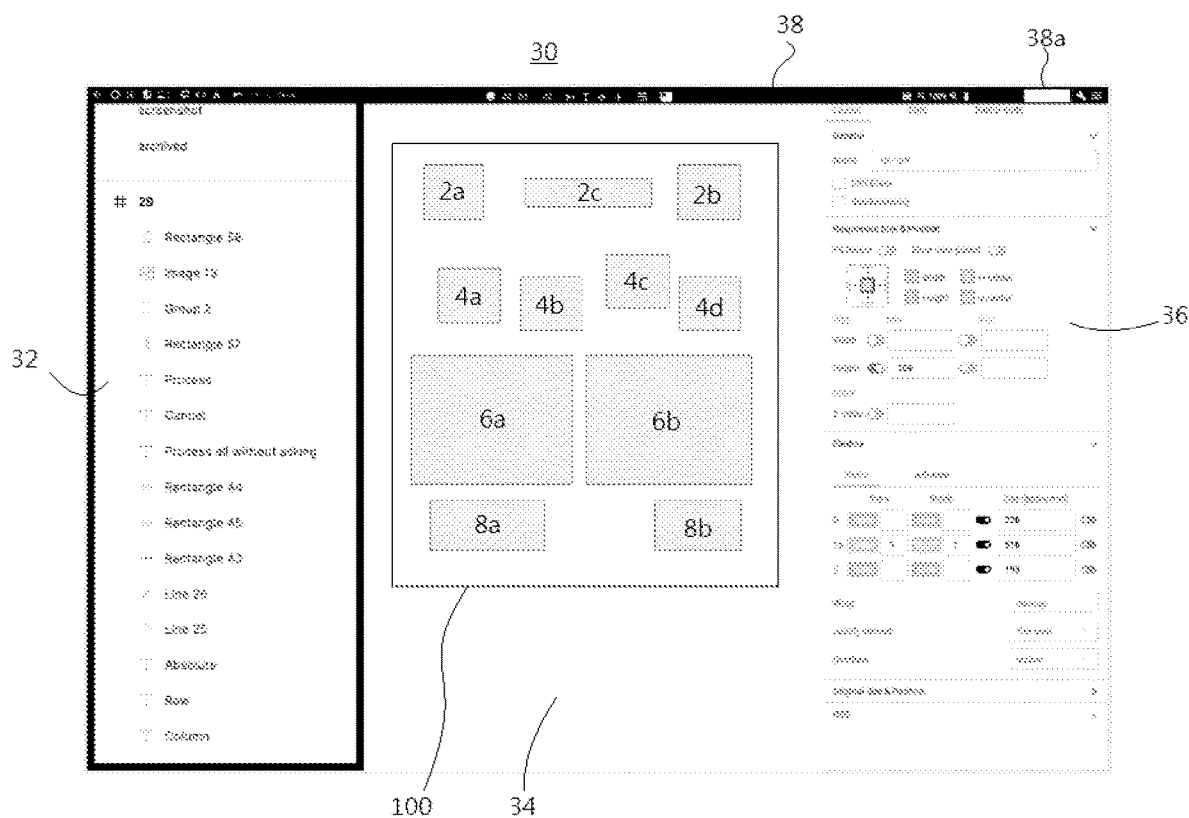
FIG. 2 is a schematic diagram of an operation interface of a system for generating a description code of a user interface according to an embodiment of the present disclosure.

FIG. 2 is a schematic diagram of an operation interface 30 of a system for generating a description code of a user interface according to an embodiment of the present disclosure. Please refer to FIGS. 1 and 2, the display module 12 of the system 10 may be configured to display an operation interface 30 on a display of a computer to serve as an interface for a user to operate the system 10. The operation interface 30 includes a graphics layer display area 32, an edit display area 34, an object attribute display area 36, and a tool bar 38. Through the operation interface 30, a user can open a programmable user interface 100 to be displayed in the edit display area 34. In this embodiment, the programmable user interface 100 may be a web interface or an application operation interface designed by any commercial image editing software on the market, such as Adobe Photoshop, Adobe XD, Illustrator, Sketch, Figma or Invision, and includes a variety of different objects including, but not limited to, images, icons, photos, text, symbols, links, menus and buttons, etc. All objects of the programmable user interface 100 may have at least one tree-structured graphics layer relationship. The graphics layer display area 32 is configured to display the at least one tree-structured graphics layer relationship. In addition, the object attribute display area 36 is configured to display attributes corresponding to the selected object on the programmable user interface 100 including, but not limited to, object name, object size, object color, object position, change characteristics of object size, etc., and may be used to input or modify attributes of the selected object. The tool bar 38 provides a number of functions for the user to edit the programmable user interface 100. In the following embodiment, a number of functions in the tool bar 38 will be enumerated for further explanation.

Figure 3A:
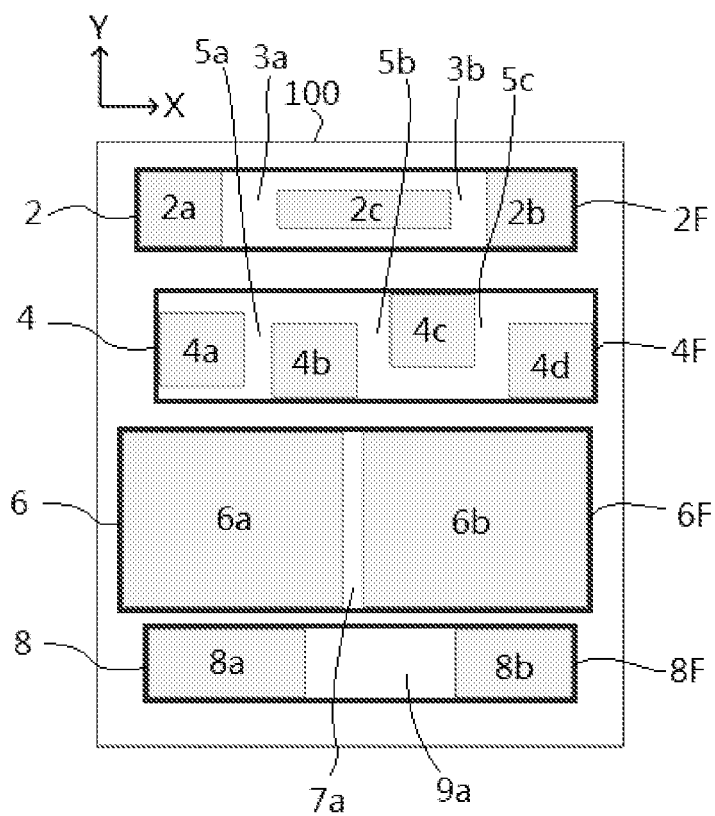
FIG. 3A is a schematic diagram of grouping a plurality of objects in FIG. 2 according to an embodiment of the present disclosure.

In this embodiment, the programmable user interface 100 includes a plurality of objects 2a-2c, 4a-4d, 6a, 6b, 8a and 8b. Each object may be an image, an icon, a photograph, text, a symbol, a link, a menus, a button, or a group of at least two of the above objects, etc. The grouping module 14 is configured to group the objects 2a-2c, 4a-4d, 6a, 6b, 8a and 8b on the programmable user interface 100 to form grouping blocks 2, 4, 6 and 8, as shown in FIG. 3A. In this embodiment, the three objects 2a, 2b and 2c are in the grouping block 2 and arranged in a first row along a first virtual straight line parallel to the X-axis; the four objects 4a, 4b, 4c and 4d are in the grouping block 4 and arranged in a second row along a second virtual straight line parallel to the X-axis; the two objects 6a and 6b are in the grouping block 6 and arranged in a third row along a third virtual straight line parallel to the X-axis; and the two objects 8a and 8b are in the grouping block 8 and arranged in a fourth row along a first virtual straight line parallel to the X-axis. In an embodiment of the present disclosure, when at least two objects are arranged along the same row (e.g., X-axis direction) or the same column (e.g., Y-axis direction), and can be enclosed by a virtual rectangular outline and/or can be projected on a virtual straight line without overlapping, the grouping module 14 groups the objects arranged in the same row or column to form a grouping block, as shown in FIG. 3A.

Now please refer to FIG. 3A. In this embodiment, the grouping block 2 has an outer frame 2F, which is substantially rectangular and encloses the objects 2a, 2b and 2c in the following manner. The inner edges of the upper side and the lower side of the outer frame 2F along the X-axis direction are respectively adjacent to the outer edges of the uppermost side and the lowermost side of the objects 2a, 2b and 2c (i.e., the uppermost side and the lowermost side of the objects 2a and 2b), and the inner edges of the left side and the right side of the outer frame 2F along the Y-axis direction are respectively adjacent to the outer edges of the leftmost side and the rightmost side of the objects 2a, 2b and 2c (i.e., the leftmost side of the object 2a and the rightmost side of the object 2b). Similarly, that grouping block 4, 6 and 8 have outer frames 4F, 6F and 8F, respectively, which are substantially rectangular and encloses the objects 4a-4d, 6a, 6b, 8a and 8b in the same manner as described above, which is not repeatedly described herein.

Figure 3B:
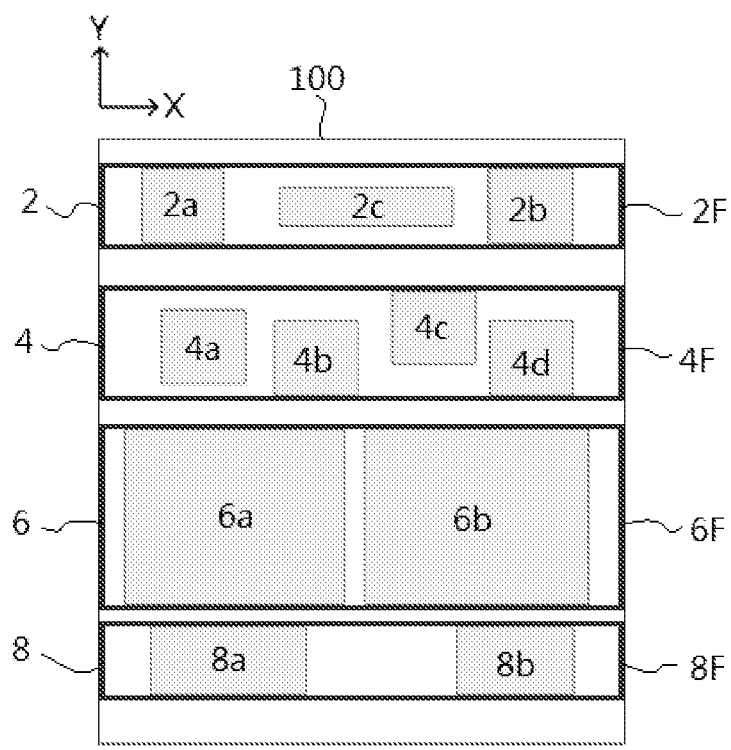
FIG. 3B is a schematic diagram of grouping a plurality of objects in FIG. 2 according to another embodiment of the present disclosure.

Now please refer to FIG. 3B. In another embodiment, the outer edges of the left sides and the right side of the outer frames 2F, 4F, 6F and 8F of the grouping blocks 2, 4, 6 and 8 along the Y-axis direction may be adjacent to the inner edges of the left side and the right side of the programmable user interface 100, respectively, such that a blank interval area exists between the inner edges of the left side and the right side of the outer frames 2F, 4F, 6F and 8F and the leftmost side and the rightmost side of the corresponding object, respectively.

In the above embodiment, the outer frames 2F, 4F, 6F and 8F are used as auxiliary frames representing the ranges of the grouping blocks 2, 4, 6 and 8, such that they are only displayed on the user interface 100 in the edit display area 34 for the designer's reference, and are not part of the user interface 100. In addition, the outer frames 2F, 4F, 6F and 8F may be continuously displayed on the programmable user interface 100 when the programmable user interface 100 is displayed in the edit display area 34 for editing, or may be displayed on the programmable user interface 100 only when the grouping blocks 2, 4, 6 and 8 are selected for editing.

Figure 4A:
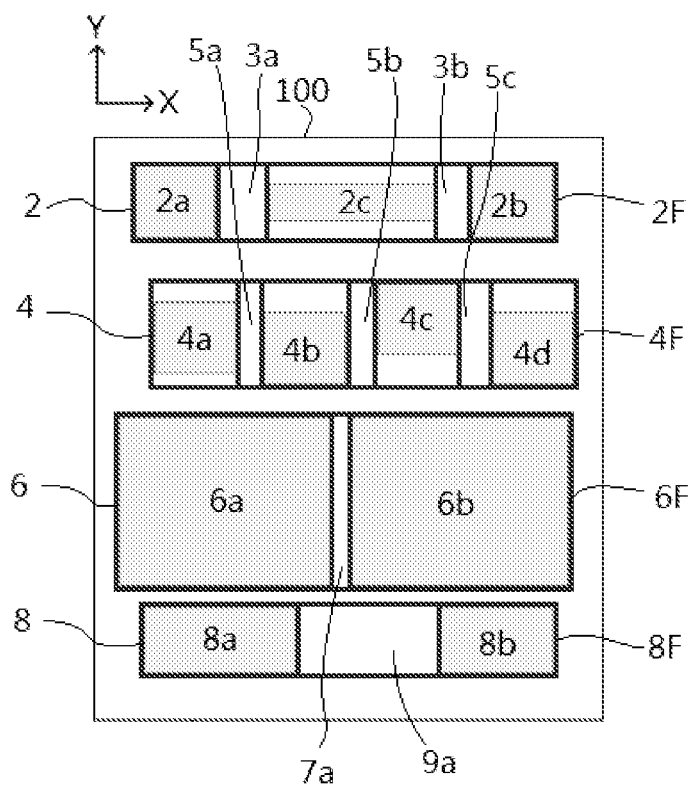
FIG. 4A is a schematic diagram of cutting a plurality of grouping blocks in FIG. 3A according to an embodiment of the present disclosure.

Now please refer to FIGS. 1, 3A and 4A, the cutting module 16 is configured to cut the grouping blocks 2, 4, 6 and 8, respectively, in the following manner. Herein, the grouping block 2 is first described as an example First, the plurality of detection modules 20 includes a first detection module 20a for detecting whether there is an interval between the objects 2a, 2b and 2c in the grouping block 2. When the first detection module 20a detects that there is an interval between the objects 2a, 2b and 2c, the cutting module 16 may cut the grouping blocks 2 into at least two sub-blocks along at least one path in the interval. In this embodiment, the first detection module 20a detects a first interval 3a between the object 2a and the object 2c, and detects a second interval 3b between the object 2b and the object 2c, wherein the interval 3a is defined by the right edge of the object 2a and the left edge of the object 2c, while the interval 3b is defined by the right edge of the object 2c and the left edge of the object 2b. After the first detection module 20a detects the first interval 3a and the second interval 3b, the cutting module 16 can cut along a path adjacent to the right edge of the object 2a and a path adjacent to the left edge of the object 2c on both sides of the first interval 3a, and cut along a path adjacent to the right edge of the object 2c and a path adjacent to the left edge of the object 2b on both sides of the second interval 3b, so as to cut the grouping blocks 2 from left to right into a first sub-block, a second sub-block, a third sub-block, a fourth sub-block and a fifth sub-block, as shown in FIG. 4A, wherein the object 2a, the first interval 3a, the object 2c, the second interval 3b and the object 2b are positioned in the first sub-block, the second sub-block, the third sub-block, the fourth sub-block and the fifth sub-block, respectively. Similarly, when the first detection module 20A detects that a plurality of intervals 5a, 5b and 5c between the objects 4a-4c in the grouping block 4, the cutting module 16 cuts the grouping block 4 into seven sub-blocks in the same manner as described above, as shown in FIG. 4A, wherein the object 4a, the interval 5a, the object 4b, the interval 5b, the object 4c, the interval 5c, and the object 4d are sequentially positioned in the seven sub-blocks, respectively. Similarly, when the first detection module 20a detects that there is an interval 7a between the objects 6a and 6b in the grouping block 6, the cutting module 16 cuts the grouping block 6 into three sub-blocks in the same manner as described above, as shown in FIG. 4A, wherein the object 6a, the interval 7a and the object 6b are sequentially positioned in the three sub-blocks, respectively. Similarly, when the first detection module 20a detects that there is an interval 9a between the objects 8a and 8b in the grouping block 8, the cutting module 16 cuts the grouping block 8 into three sub-blocks in the same manner as described above, as shown in FIG. 4A, wherein the object 8a, the interval 9a and the object 8b are positioned in the three sub-blocks, respectively.

Figure 4B:
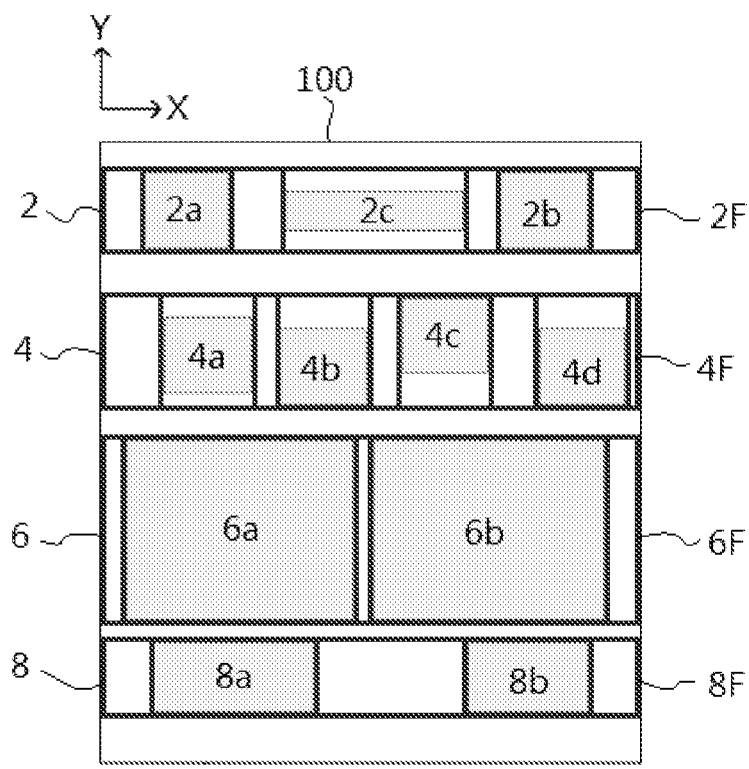
FIG. 4B is a schematic diagram of cutting a plurality of grouping blocks in FIG. 3B according to another embodiment of the present disclosure.

Now please refer to FIGS. 3B and 4B, in other embodiments, when the outer frames 2F, 4F, 6F and 8F of the grouping blocks 2, 4, 6 and 8 enclose the blank interval areas on both sides of the corresponding objects, the cutting module 16 further cuts along the paths adjacent to the two outer edges of the objects on both sides (e.g., the left edge of the object 2a and the right edge of the object 2b), so as to further cut two additional sub-blocks for each grouping block to respectively accommodate the blank interval areas on both sides of the corresponding objects, as shown in FIG. 4B.

Figure 4C:
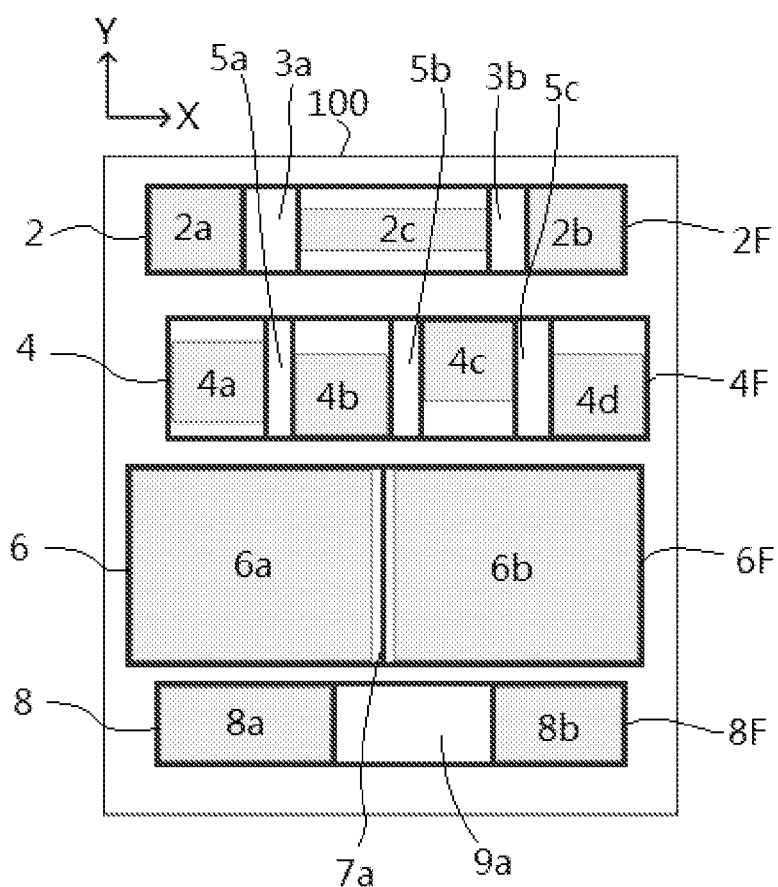
FIG. 4C is a schematic diagram of cutting a plurality of grouping blocks in FIG. 3A according to another embodiment of the present disclosure.

In another embodiment, the detection module 20a may further be configured to detect whether each interval between the objects is larger than a preset value (e.g., the length of 8 logical pixels). When the detected interval is smaller than the preset value, the cutting module 16 cuts along a path in the middle of the interval. When the detected interval is larger than the preset value, the cutting module 16 cuts along two paths on both sides of the interval, respectively. For example, as shown in FIG. 4C, the cutting module 16 is configured to cut a grouping block 6 and a grouping block 8. The grouping block 6 includes an object 6a and an object 6b, and there is an interval 7a between the objects 6a and 6b, wherein the width of the interval 7a is the length of 6 logical pixels. The grouping block 8 includes an object 8a and an object 8b, and there is an interval 9a between the objects 8a and 8b, wherein the width of the interval 9a is the length of 12 logical pixels. The detection module 20a is configured to detect whether the interval 7a exists between the objects 6a and 6b in the grouping block 6. When the first detection module 20a detects that the interval 7a exists between the objects 6a and 6b, the first detection module 20a further detects whether the interval 7a is larger than a preset value (e.g., the length of 8 logical pixels). When the interval 7a (the length of 6 logical pixels) detected by the first detection module 20a is smaller than the preset value, the cutting module 16 cuts along a path in the middle of the interval 7a to cut the grouping block 6 into two sub-blocks. In addition, when the first detection module 20a detects that the interval 9a exists between the objects 8a and 8b, the first detection module 20a further detects whether the interval 9a is larger than the preset value (e.g., the length of 8 logical pixels). When the interval 9a (the length of 12 logical pixels) detected by the first detection module 20a is larger than the preset value, the cutting module 16 cuts along a path adjacent to the right edge of the object 8a on a side of the interval 9a, and cuts along a path adjacent to the left edge of the object 8b on another side of the interval 9a, thereby cutting the grouping block 8 into three sub-blocks.

Figure 5:
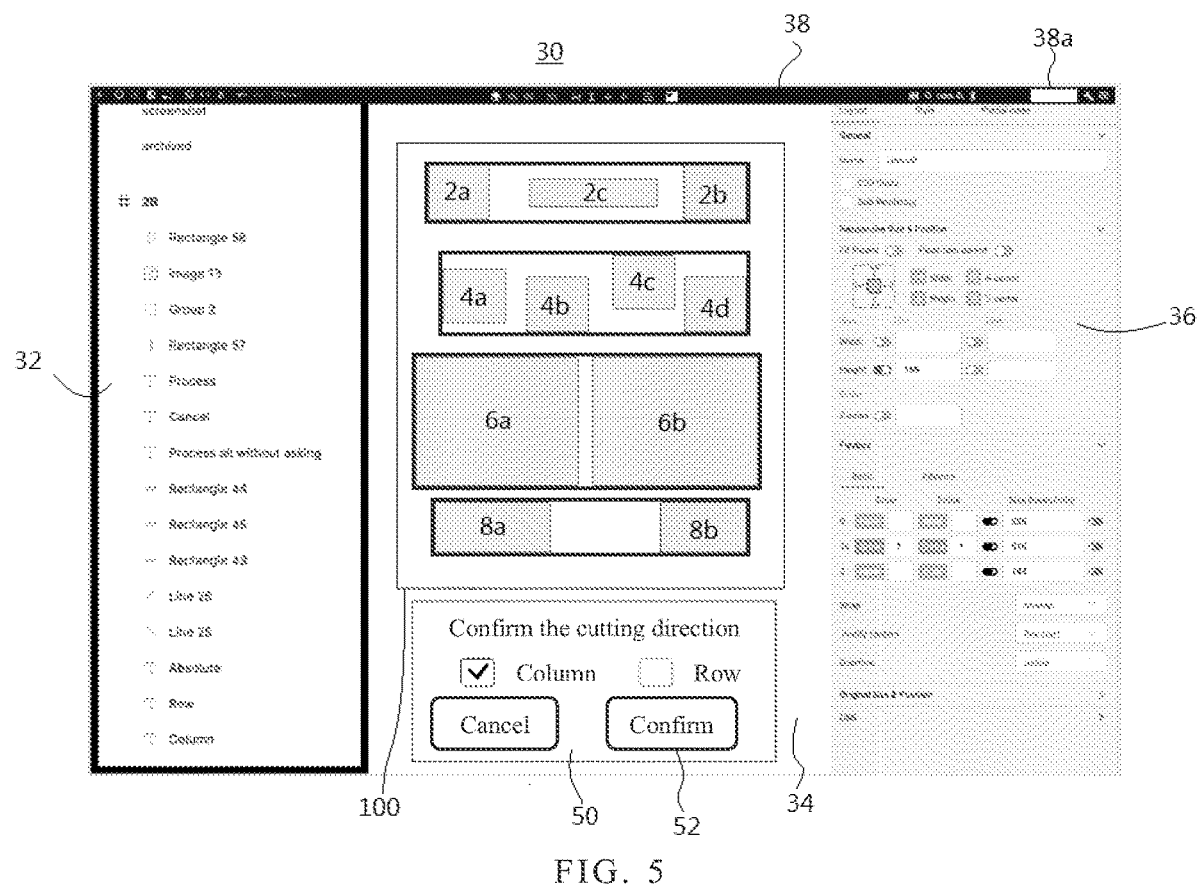
FIG. 5 is a schematic diagram of an operation interface before cutting a plurality of grouping blocks in FIG. 3A according to another embodiment of the present disclosure.

In addition, in other embodiments, as shown in FIG. 5, after the grouping module 14 groups the plurality of objects 2a-2c, 4a-4d, 6a, 6b, 8a and 8b on the programmable user interface 100 into a plurality of different groups, the display module 12 further displays a message box 50, and a confirmation button 52 is provided in the message box 50 for the user to confirm whether to cut between the objects in the grouping block. The plurality of detection modules 20 further have a second detection module 20b for detecting whether the confirmation button 52 is selected. When the second detection module 20b detects that the confirm button 52 is selected, the cutting module 16 cuts the grouping block into a plurality of sub-blocks along at least one path in the interval, as shown in FIG. 4A.

Figure 6:
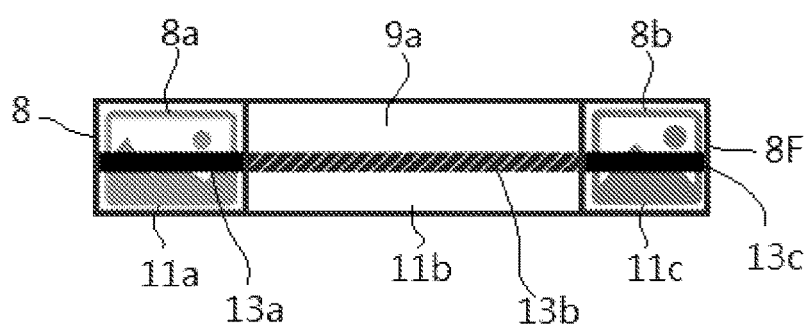
FIG. 6 is a schematic diagram of setting display attributes of sub-blocks of a grouping block in FIG. 4A according to an embodiment of the present disclosure.

Now please refer to FIG. 1, FIG. 4A and FIG. 6, the setting module 18 is configured to set the display attribute of each sub-block cut by the cutting module 16 in the grouping blocks 2, 4, 6 and 8. In an embodiment, the grouping block 8 is described as an example. In FIG. 6, the grouping block 8 includes an object 8a and an object 8b, and there is an interval 9a between the two objects 8a and 8b. The cutting module 16 cuts the grouping blocks 8 into three sub-blocks 11a, 11b and 11c in the manner described above, and the object 8a, the interval 9a and the object 8b are in the three sub-blocks 11a, 11b and 11c, respectively. The setting module 18 is configured to set the display attributes of the three sub-blocks 11a, 11b, and 11c so as to ensure that the three sub-blocks 11a, 11b and 11c after the setting can be normally displayed on various displays of different sizes, so as to avoid abnormal layout such as overlapping objects, inappropriate object arrangement position and improper object size. In this embodiment, the two objects 8a and 8b are two different images respectively. The setting module 18 sets the sub-block 11a as having a fixed display attribute, and the display module 12 displays an attribute line segment 13a on the sub-block 11a, and the attribute line segment 13a presents a first color (e.g., yellow) to indicate the fixed display attribute of the sub-block 11a. Similarly, the setting module 18 sets the sub-block 11c as having a fixed display attribute, and the display module 12 displays an attribute line segment 13c on the sub-block 11c. The attribute line segment 13c presents a first color (e.g., yellow) to indicate the fixed display attribute of the sub-block 11c. In addition, the setting module 18 sets the sub-block 11b as having an extendable display attribute, and the display module 12 displays an attribute line segment 13b on the sub-block 11b. The attribute line segment 13b presents a second color (e.g., green) to indicate the extendable display attribute of the sub-block 11b.

In one embodiment of the present disclosure, after the setting module 18 sets the display attributes of the three sub-blocks 11a, 11b and 11c, the description code generation module 22 can automatically generate the description code corresponding to the three sub-blocks 11a, 11b and 11c according to the display attributes of the three sub-blocks 11a, 11b and 11c. In another embodiment of the present disclosure, the tool bar 38 further includes a description code generation button 38a, as shown in FIG. 2. After the setting module 18 sets the display attributes of the three sub-blocks 11a, 11b and 11c, and when the description code generation button 38a is selected (e.g., clicked or pressed), the description code generation module 22 generates a description code corresponding to the three sub-blocks 11a, 11b and 11c according to the display attributes of the three sub-blocks 11a, 11b and 11c, and the display module 12 displays the generated description code in the object attribute display area 36. In other embodiments, when the description code generation button 38a is selected (e.g., clicked or pressed), the description code generation module 22 may generate a description code corresponding to the programmable user interface 100, or may only generate a description code corresponding to selected objects, grouping blocks, sub-blocks on the programmable user interface 100, and the display module 12 may display all or part of the generated description code in the object attribute display area 36. In the aforementioned or following embodiments of the present disclosure, a description code may be a code compatible with programming languages for designing web pages, such as HTML, React and Vue.js, or AngularJS, or a code compatible with programming languages for designing user interfaces of applications (APP), such as React Native, Flutter, Android XML and iOS Swift. In some embodiments of the present disclosure, the description code may be a code in the Cascading Style Sheets (CSS) programming language.

Figure 7:
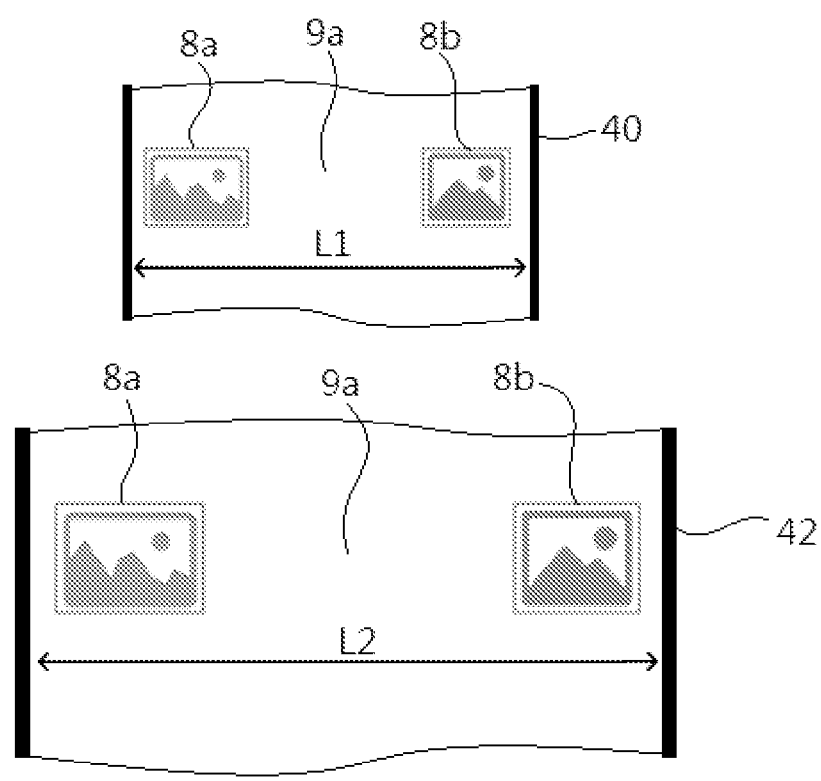
FIG. 7 is a partial schematic diagram of the grouping block in FIG. 6 displayed respectively on two displays of different sizes after the setting.

FIG. 7 is a partial schematic diagram of the grouping block 8 displayed respectively on two displays 40 and 42 of different sizes after the setting. The display 40 may be, for example, a smart phone display having a length (or width) L1, and the display 42 may be, for example, a tablet computer display having a length (or width) L2 that is greater than the length (or width) L1. Now please continue referring to FIGS. 6 and 7, when the setting module 18 sets both the sub-block 11a and the sub-block 11c as having the fixed display attribute, the logical unit lengths of the sub-block 11a and the sub-block 11c are fixed, indicating that when the programmable user interface 100 is respectively displayed on two different-sized displays 40 and 42 (as shown in FIG. 7), the logical unit lengths of the sub-block 11a and the sub-block 11c will not change due to the lengths of the displays 40 and 42, i.e., the logical unit lengths of the object 8a and the object 8b will not change due to the lengths L1 and L2 of the displays 40 and 42. When the sub-block 11b is set as having the extendable display attribute, the logical unit length of the sub-block 11b changes adaptively according to the length of a display displaying the programmable user interface 100. For example, when the programmable user interface 100 is respectively displayed by the display 40 and the display 42 as shown in FIG. 7, the logical unit length of the sub-block 11b changes adaptively according to the length L1 of the display 40 and the length L2 of the display 42, wherein the length L2 is greater than the length L1, such that the interval 9a displayed on the display 42 is longer than the interval 9a displayed on the display 40. In this embodiment, the logical unit length refers to the basic unit length used in designing the programmable user interface 100 in an image editing software, which may be in units of, for example, logical pixels or logical points, but is not limited thereto. In other embodiments, the logical unit length may also be in units of actual pixels of a display. In general, when a display displays a user interface, it may multiply the logical pixels of the user interface by a preset magnification factor to convert the logical pixels into actual pixels for displaying the user interface, so that the sizes of fonts and images of the user interface on the display are suitable for user viewing.

Figure 8A:
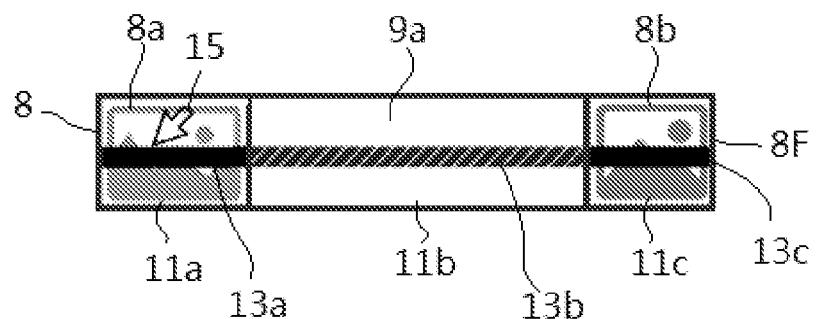
FIGS. 8A-8D are schematic diagrams of changing the display attributes of sub-blocks of the grouping block in FIG. 6 according to an embodiment of the present disclosure.
Figure 8B:
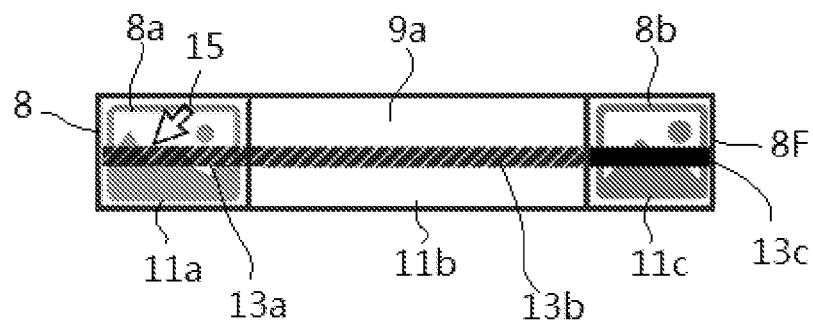

Now please refer to FIGS. 1 and 6, the plurality of detection modules 20 further includes a third detection module 20c for detecting whether at least one of the attribute line segments 13a-13b is selected. When the third detection module 20c detects that at least one of the attribute line segments 13a-13b is selected, the setting module 18 changes the display attribute of the sub-block corresponding to the selected attribute line segment, and the display module 12 changes the color presented by the at least one selected attribute line segment 13a-13b. For example, as shown in FIGS. 8A and 8B, when the attribute line segment 13a is clicked by a mouse cursor 15, the third detection module 20c detects that the attribute line segment 13a is selected. When the third detection module 20c detects that the attribute line segment 13a is selected, the setting module 18 changes the fixed display attribute of the sub-block 11a to the extendable display attribute, and the display module 12 changes the first color (e.g., yellow) presented by the selected attribute line segment 13a to the second color (e.g., green), wherein the second color (e.g., green) is used to represent the extendable display attribute. Similarly, when the setting module 18 changes the fixed display attribute of the sub-block 11a to the extendable display attribute, the logical unit length of the sub-block 11a changes adaptively according to the length of a display displaying the programmable user interface 100, in the same way as the logical unit length of the sub-block 11b. In this embodiment, after the color presented by the attribute line segment 13a is changed to the second color (e.g., green) (as shown in FIG. 8B), if the attribute line segment 13a is clicked again by the mouse cursor 15, the color presented by the attribute line segment 13a may change back to the first color (e.g., yellow) (as shown in FIG. 8A), and the setting module 18 changes the extendable display attribute of the sub-block 11a back to the fixed display attribute. In other embodiments, after the color presented by the attribute line segment 13a changes to the second color (e.g., green) (as shown in FIG. 8B), if the attribute line segment 13a is clicked again by the mouse cursor 15, the color presented by the attribute line segment 13a can change to a third color (e.g., purple) (not shown), and the setting module 18 changes the extendable display attribute of the sub-block 11a to another display attribute. For example, if the object 8a contained in the sub-block 11a is a block for inputting characters, the setting module 18 may change the extendable display attribute of the sub-block 11a to another fixed display attribute. For example, in case of another display attribute, the logical unit length of the sub-block 11a will change according to the number of characters input, but does not change adaptively according to the length of a display. Similarly, after the color presented by the attribute line segment 13a is changed to the third color (e.g., purple) (not shown), if the attribute line segment 13a is clicked again by the mouse cursor 15, the color presented by the attribute line segment 13a may change back to the first color (e.g., yellow) (as shown in FIG. 8A), and the setting module 18 changes the display attribute of the sub-block 11a back to the original fixed display attribute. In addition, when the attribute line segment 13c is clicked by a mouse cursor in the same way, the setting module 18 changes the fixed display attribute of the sub-block 11c to the extendable display attribute, and the display module 12 changes the first color (e.g., yellow) presented by the selected attribute line segment 13c to the second color (e.g., green), wherein the second color (e.g., green) is used to represent the extendable display attribute.

Figure 8C:
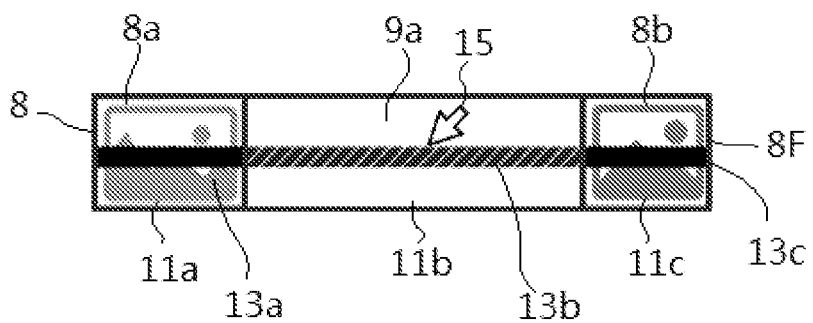
Figure 8D:
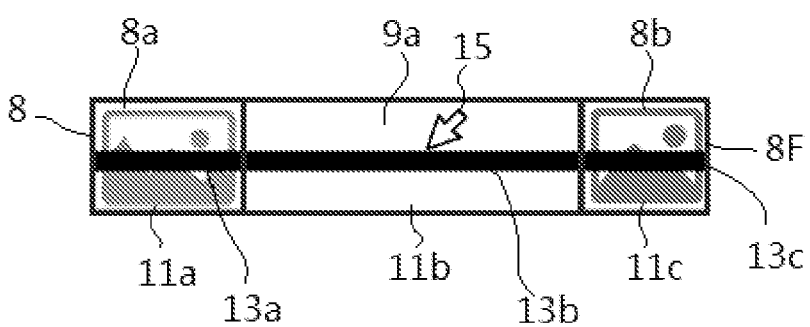

As shown in FIGS. 8C and 8D, when the attribute line segment 13b is clicked by a mouse cursor 15, the third detection module 20c detects that the attribute line segment 13b is selected. When the third detection module 20c detects that the attribute line segment 13b is selected, the setting module 18 changes the extendable display attribute of the sub-block 11b to the fixed display attribute, and the display module 12 changes the second color (e.g., green) (as shown in FIG. 8C) presented by the selected attribute line segment 13b to the first color (e.g., yellow) (as shown in FIG. 8D), wherein the first color (e.g., yellow) is used to represent the fixed display attribute. Similarly, when the setting module 18 changes the extendable display attribute of the sub-block 11b to a fixed display attribute, the logical unit length of the sub-block 11b will be fixed in the same way as that of the sub-block 11a. In this embodiment, after the color presented by the attribute line segment 13b is changed to the first color (e.g., yellow) (as shown in FIG. 8D), if the attribute line segment 13b is clicked again by the mouse cursor 15, the color presented by the attribute line segment 13b may change back to the second color (e.g., green) (as shown in FIG. 8C), and the setting module 18 changes the fixed display attribute of the sub-block 11b back to the extendable display attribute. Similarly, the attribute line segment 13c can also change the display attribute of the sub-block 11c by being clicked by a mouse cursor 15, which will not be repeatedly described in detail herein.

Figure 9A:
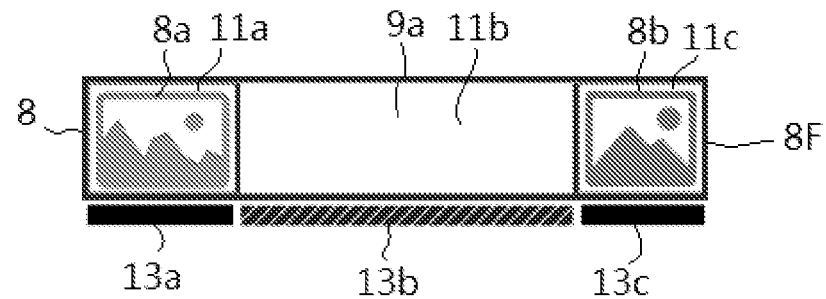
FIGS. 9A and 9B are schematic diagrams of setting display attributes of sub-blocks of a grouping block in FIG. 2 according to other embodiments of the present disclosure.
Figure 9B:
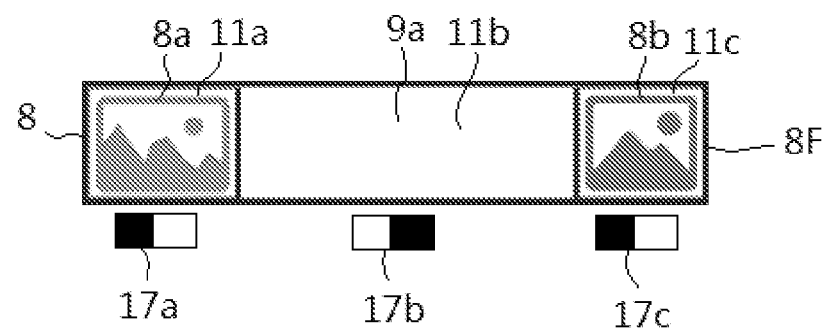

In the embodiment described above, the user can change the display attributes of the sub-blocks 11a-11c by quickly selecting the attribute line segments 13a-13c, as shown in FIGS. 8A-8D. It should be appreciated that in the above embodiment, the attribute segments 13a-13c are respectively displayed on the sub-blocks 11a-11c, but the present disclosure is not limited thereto. The attribute line segments 13a-13c may also be displayed on the sides adjacent to the sub-blocks 11a-11c, as shown in FIG. 9A, which can also achieve the purpose of changing the display attributes of the sub-blocks 11a-11c. In addition, in this embodiment, although the attribute line segments 13a-13c are solid lines, they are not limited thereto. The attribute line segments 13a-13c may also be in a form of line segment such as dashed line or broken line or any other attribute elements not in a form of line segment for controlling and presenting the display attributes of the corresponding sub-blocks. For example, as shown in FIG. 9B, the attribute line segments 13a-13c may be replaced by three attribute switches 17a-17c, and the two different display attributes are presented by the switching of the attribute switches 17a-17c to further represent different display attributes of the sub-blocks 11a-11c. In addition, except being selected by the clicking of a mouse cursor, the attribute elements described in the above embodiment can also be selected by direct clicking on a touch panel, or by a browsing button on the keyboard, or by an input control device in any other form.

Now please refer to FIGS. 1, 2 and 6, when the setting module 18 sets the display attributes of the sub-blocks 11a, 11b, and 11c as a fixed display attribute, an extendable display attribute, and a fixed display attribute, the description code generation module 22 automatically generates a description code corresponding to the sub-blocks 11a, 11b and 11c according to the display attributes of the sub-blocks 11a, 11b and 11c, or generates a description code corresponding to the sub-blocks 11a, 11b and 11c when the description code generation button 38a is selected. In an embodiment of the present disclosure, the description code corresponding to the sub-blocks 11a, 11b and 11c may be HTML-compatible codes, and a part of the codes are listed here as follows:

```
<style>
Group8 {
display: flex;
}
Object_8a {
flex-grow: 0;
flex-shrink: 0;
flex-basis: 226px;
background-image: url(8a.png);
}
space {
flex-grow: 1;
flex-shrink: 1;
flex-basis: 516px;
}
Object_8b {
flex-grow: 0;
flex-shrink: 0;
flex-basis: 193;
background-image: url(8b.png);
}
</style>
<body>
<div className="group8">
<div className="Object_8a" />
<div className="space" />
<div className="Object_8b" />
</div>
</body>
```

In the above description code, the description code between <style> and </style> are layout descriptions of the CSS language for defining the display attributes of the sub-blocks 11a, 11b and 11c in the group 8, wherein "Object_8a" is used to represent the sub-block 11a containing the object 8a, and "flex-grow: 0" defined in "Object_8a" is used to indicate that the sub-block 11a does not become longer adaptively according to the length of a display, and "flex-shrink: 0" defined in "Object_8a" is used to indicate that the sub-block 11a does not become shorter adaptively according to the length of a display, that is, the display attribute of the sub-block 11a is a fixed display attribute; "space" is used to represent the sub-block 11b containing the interval 9a, and "flex-grow: 1" defined in "space" is used to indicate that the sub-block 11b does not become longer adaptively according to the length of a display, and "flex-shrink: 1" defined in "space" is used to indicate that the sub-block 11b does not become shorter adaptively according to the length of a display, that is, the display attribute of the sub-block 11b is an extendable display attribute, and "Object_8b" is used to represent the sub-block 11c containing the object 8b, and "flex-grow: 0" defined in "Object_8b"

is used to indicate that the sub-block 11*c* does not become longer adaptively according to the length of a display, and "flex-shrink: 0" defined in "Object_8*b*" is used to indicate that the sub-block 11*c* does not become shorter adaptively according to the length of a display, that is, the display attribute of the sub-block 11*c* is a fixed display attribute. In addition, the description code between <body> and </body> are structural descriptions of HTML, which is a conventional HTML language format and is not described in detail here.

Now please refer to FIGS. 1, 2, 8A and 8B. When the display attribute of the sub-block 11*a* is changed from a fixed display attribute to an extendable display attribute, the description code generation module 22 automatically generates a description code corresponding to the sub-block 11*a* according to the display attribute of the sub-block 11*a*, or generates a description code corresponding to the sub-block 11*a* when the description code generation button 38*a* is selected (e.g., clicked or pressed). Taking the codes in the above embodiment as an example, after the display attribute of the sub-block 11*a* is changed from a fixed display attribute to an extendable display attribute, the description code corresponding to the sub-block 11*a* are changed as follows:

```
Object_8a {
flex-grow: 1;
flex-shrink: 1;
flex-basis: 226px;
background-image: url(8a.png);
}
```

Compared with the code in the above embodiment, the only difference is that the values after "flex-grow" and "flex-shrink" defined in "Object_8*a*" are changed from "0" to "1," i.e. "flex-grow: 1" and "flex-shrink: 1," wherein "flex-grow: 1" indicates that the sub-block 11*a* does not become longer adaptively according to the length of a display, and "flex-shrink: 1" indicates that the sub-block 11*a* does not become shorter adaptively according to the length of a display, that is, the display attribute of the sub-block 11*a* is an extendable display attribute.

Similarly, as shown in FIGS. 1, 2, 8C, and 8D, when the display attribute of the sub-block 11*b* is changed from an extendable display attribute to a fixed display attribute, the description code generation module 22 automatically generates a description code corresponding to the sub-block 11*b* according to the display attribute of the sub-block 11*b*, or generates a description code corresponding to the sub-block 11*b* when the description code generation button 38*a* is selected (e.g., clicked or pressed). Also taking the code in the above embodiment as an example, when the display attribute of the sub-block 11*b* is changed from an extendable display attribute to a fixed display attribute, the description code corresponding to the sub-block 11*b* is changed as follows:

```
space {
flex-grow: 0;
flex-shrink: 0;
flex-basis: 516px;
}
```

Compared with the code in the above embodiment, the only difference is that the values after "flex-grow" and "flex-shrink" defined in "space" are changed from "1" to "0," i.e., "flex-row: 0" and "flex-shrink: 0," wherein "flex-row: 0" is used to indicate that the sub-block 11*b* does not become longer adaptively according to the length of a display, and "flex-shrink: 0" is used to indicate that the sub-block 11*b* does not become shorter adaptively according to the length of a display, that is, the display attribute of the sub-block 11*b* is a fixed display attribute.

Figure 10:
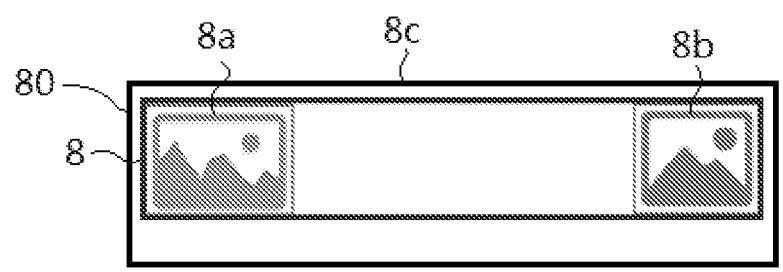
FIG. 10 is a schematic diagram of a grouping block according to an embodiment of the present disclosure.

FIG. 10 is a schematic diagram of a grouping block 80 according to an embodiment of the present disclosure. Now please refer to FIGS. 1, 3A and 10, the programmable user interface 100 further includes an object 8*c* having a peripheral outline. The grouping block 8 includes the object 8*a* and the object 8*b*, and is in an area enclosed by the peripheral outline of the object 8*c*. The plurality of detection modules 20 further include a fourth detection module 20*d* for detecting whether the grouping block 8 is in the area enclosed by the peripheral outline of the object 8*c*. When the fourth detection module 20*d* detects that the grouping block 8 is in the area enclosed by the peripheral outline of the object 8*c*, the grouping module 14 further groups the grouping block 8 and the object 8*c* into a grouping block 80.

Figure 11:
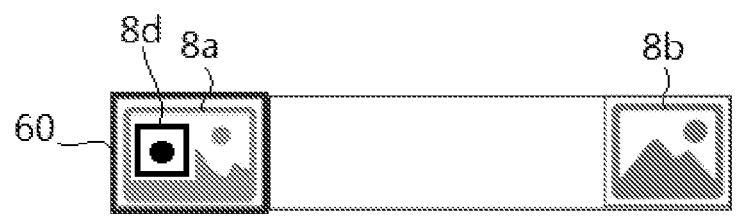
FIG. 11 is a schematic diagram of a grouping block according to another embodiment of the present disclosure.

FIG. 11 is a schematic diagram of a grouping block 60 according to an embodiment of the present disclosure. Now please refer to FIGS. 1, 3A and 11, the programmable user interface 100 further includes an object 8*d*, and the object 8*a* has a peripheral outline. The object 8*d* is in an area enclosed by the peripheral outline of the object 8*a*. The plurality of detection modules 20 further include a fifth detection module 20*e* for detecting whether the object 8*d* is in the area enclosed by the peripheral outline of the object 8*a*. When the fifth detection module 20*e* detects that the object 8*d* is in the area enclosed by the peripheral outline of the object 8*a*, the grouping module 14 further groups the object 8*d* and the object 8*a* into a group 60.

Figure 12:
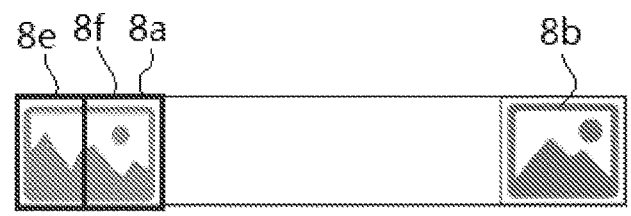
FIG. 12 is a schematic diagram of an arrangement of a plurality of objects according to an embodiment of the present disclosure.

FIG. 12 is a schematic diagram of an arrangement of a plurality of objects 8*b*, 8*e* and 8*f* according to an embodiment of the present disclosure. Now please refer to FIGS. 1, 3A and 12, the programmable user interface 100 further includes an object 8*e* and an object 8*f*, and the object 8*e* partially overlaps with the object 8*f*. The plurality of detection modules 20 further includes a sixth detection module 20*f* for detecting whether the object 8*e* overlaps with the object 8*f*. When the sixth detection module 20*f* detects that the object 8*e* overlaps with the object 8*f*, the grouping module 14 further groups the object 8*e* and the object 8*f* into the object 8*a*.

According to the above embodiment of the present disclosure, in the grouping blocks 2, 4, 6 and 8 on the programmable user interface 100 shown in FIGS. 4A, 4B and 4C, the display attributes of the objects 2*a*-8*b* and the intervals between the objects can be rapidly set or changed by selecting the various attribute elements shown in FIGS. 8A-8D, 9A and 9B, and after finishing the setting or the change of the display attributes, the system 10 disclosed by the present disclosure can further generate corresponding description codes according to the display attributes, thereby effectively shortening the time of program development and programming.

In addition, the system 10 according to the present disclosure further provides a way to quickly set the display attribute of an object itself and the display attributes corresponding to the distances between the object and the outer frame of its parent graphics layer. Now please refer to FIGS. 1 and 3A, the setting module 18 can respectively set the display attributes of the distances between the four sides of any one of the objects 2*a*-2*c*, 4*a*-4*d*, 6*a*-6*b* and 8*a*-8*b* and the four sides of a corresponding parent graphics layer (e.g., the grouping blocks 2, 4, 6 and 8), and can respectively set the display attributes of the lengths and the widths of the objects 2a-2c, 4a-4d, 6a-6b and 8a-8b. In the following, the object 2c and its corresponding parent graphics layer (for example, the grouping block 2) will be described as an example.

Figure 13A:
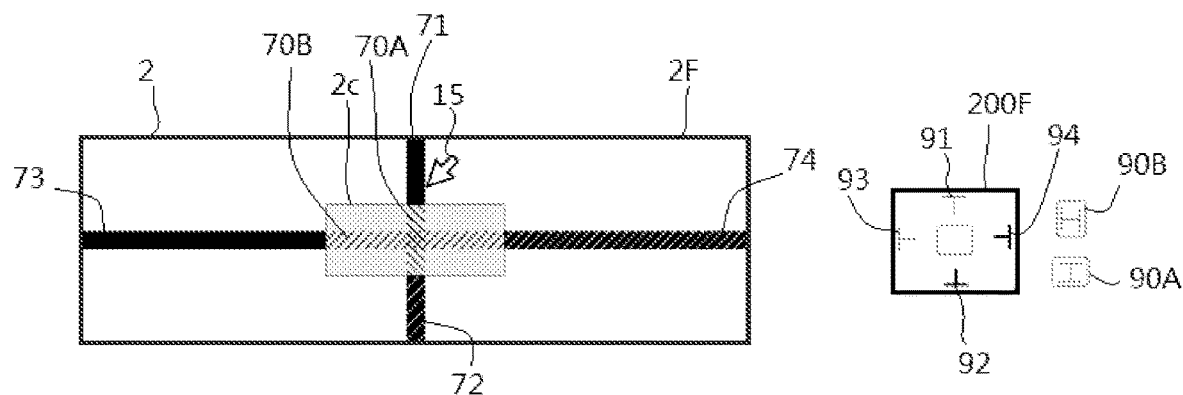
FIGS. 13A and 13B are schematic diagrams of setting display attributes of the distances between an object and the outer frame of its parent graphics layer according to an embodiment of the present disclosure.

Now please refer to FIG. 13A, the setting module 18 can set the distance between the upper side of the outer frame 2F of the grouping block 2 and the upper side of the object 2c as having a first fixed display attribute, set the distance between the lower side of the outer frame 2F and the lower side of the object 2c as having a first expandable display attribute, set the distance between the left side of the outer frame 2F and the left side of the object 2c as having a second fixed display attribute, and set the distance between the right side of the outer frame 2F and the right side of the object 2c as having a second expandable display attribute. In addition, the setting module 18 further sets the distance between the upper side and the lower side (i.e., height) of the object 2c as having a third fixed display attribute, and sets the distance between the left side and the right side (i.e., width) of the object 2c as having a fourth fixed display attribute. In this embodiment, when the setting module 18 sets the above distances as having fixed display attributes, the logical unit lengths of the distances are fixed, indicating that when the programmable user interface 100 is respectively displayed on two displays of different sizes, the logical unit lengths of the distances do not change due to the lengths of the displays. In addition, when the setting module 18 sets the above distances as having extendable display attributes, the logical unit lengths of the distances change adaptively according to the length of a display displaying the programmable user interface 100. The definitions of the fixed display attributes and the extendable display attributes are the same as those described in the embodiment of FIG. 7, and are not repeatedly described herein. In addition, in this embodiment, the grouping block 2 is the parent graphics layer of the object 2c, but it is not limited thereto. In other embodiments, the parent graphics layer of the object 2c may be another block including only the object 2c but excluding the objects 2a and 2b.

Now please refer to FIG. 1, FIG. 3A and FIG. 13A, the plurality of detection modules 20 further includes a seventh detection module 20g for detecting whether the object 2c is selected. When the seventh detection module 20g detects that the object 2c is selected by a mouse cursor, a touch panel, or a keyboard, the display module 12 displays two orthogonally intersecting object attribute line segments 70A and 70B on the object 2c, and four distance attribute line segments 71, 72, 73 and 74 respectively between the four sides of the object 2c and the four sides of the outer frame 2F of the grouping block 2. In addition, the display module 12 displays an outer frame icon 200F, an object height icon 90A, an object width icon 90B, and four distance icons 91, 92, 93 and 94 in the object attribute display area 36. The outer frame icon 200F corresponds to the outer frame 2F of the grouping block 2. In this embodiment, the distance attribute line segment 71 presents a first color (e.g., light blue) to represent the first fixed display attribute. The distance attribute line segment 72 presents a second color (e.g., pink) to represent the first extendable display attribute. The distance attribute line segment 73 presents the first color (e.g., light blue) to represent the second fixed display attribute. The distance attribute line segment 74 presents the second color (e.g., pink) to represent the second extendable display attribute. In addition, the object attribute line segment 70A presents a third color (e.g., blue) to represent the third fixed display attribute, and the object attribute line segment 70B presents the third color (e.g., blue) to represent the fourth fixed display attribute. The object height icon 90A corresponds to the object attribute line segment 70A, and the color presented by the object height icon 90A is substantially the same as (i.e., similar to, the same as, or belonging to the same color series as) the third color (e.g., blue). The object width icon 90B corresponds to the object attribute line segment 70B, and the color presented by the object width icon 90B is substantially the same as (i.e., similar to, the same as, or belonging to the same color series as) the third color (e.g., blue). The distance icon 91 corresponds to the distance attribute line segment 71, and the color presented by the distance icon 91 is substantially the same as (i.e., similar to, the same as, or belonging to the same color series as) the first color (e.g., light blue). The distance icon 92 corresponds to the distance attribute line segment 72, and the color presented by the distance icon 92 is substantially the same as (i.e., similar to, the same as, or belonging to the same color series as) the second color (e.g., pink). The distance icon 93 corresponds to the distance attribute line segment 73, and the color presented by the distance icon 93 is substantially the same as (i.e., similar to, the same as, or belonging to the same color series as) the first color (e.g., light blue). The distance icon 94 corresponds to the distance attribute line segment 74, and the color presented by the distance icon 94 is substantially the same as (i.e., similar to, the same as, or belonging to the same color series as) the second color (e.g., pink).

Now please refer to FIGS. 1, 2 and 13A, after the setting module 18 sets the display attributes of the four distances between the four sides of the outer frame 2F and the four sides of the object 2c and the display attributes of the length and the width of the object 2c, the description code generation module 22 can automatically generate the corresponding description code according to the display attributes of the four distances and the display attributes of the length and the width, or generate the corresponding description code when the description code generation button 38a shown in FIG. 2 is selected (e.g., clicked or pressed), and the display module 12 displays the description code generated by the description code generation module 22 in the object attribute display area 36. In an embodiment of the present disclosure, the description code corresponding to the four distances between the four sides of the outer frame 2F and the four sides of the object 2c and the length and the width of the object 2c may be a React-compatible code, and a part of the program code is listed here as follows:

```
import React, { Component } from 'react';
import { Px } from 'components/posize.v1.00';
export default class partialCode extends Component {
render( ) {
return (
<div className={css(styles.Frame_2f)}>
<Px x="110px 135px 96fr"
y="17px 30px 14fr"
```

```
      className={css(styles.Object_2c)} />
    </div>
  );
  }
}
const styles = StyleSheet.create({
  Frame_2f: { width: '100%', display: 'flex', position: 'relative', minHeight:
'61px'},
  Object_2c: { width: '100%', height: '100%', backgroundColor:
'rgb(212,212,212)'}
  });
```

In the above description code, the description code in lines 1 to 13 is structure and layout descriptions of the JavaScript (JSX in React) language for defining the four distance display attributes between the four sides of the outer frame 2F and the four sides of the object 2c and the display attributes of the length and the width of the object 2c, wherein the "110px" in the seventh line is used to indicate that the distance between the left side of the outer frame 2F and the left side of the object 2c is 110 pixels and is a fixed display attribute, the "135px" in the seventh line is used to indicate that the distance between the left side and the right side (i.e., width) of the object 2c is 135 pixels and is a fixed display attribute, and the "96fr" in the seventh line is used to indicate that the distance between the right side of the outer frame 2F and the right side of the object 2c is 96 pixels and is an extendable display attribute. In addition, the "17px" in the eighth line is used to indicate that the distance between the upper side of the outer frame 2F and the upper side of the object 2c is 17 pixels and is a fixed display attribute, the "30px" in the eighth line is used to indicate that the distance between the upper side and the lower side (i.e., height) of the object 2c is 30 pixels and is a fixed display attribute, and the "14fr" in the eighth line is used to indicate that the distance between the lower side of the outer frame 2F and the lower side of the object 2c is 14 pixels and is an extendable display attribute. In addition, the description code In lines 14 to 19 is descriptions of the CSS language in the JavaScript language (CSS In JS), which is a conventional language format and is not described In detail herein.

Figure 13B:
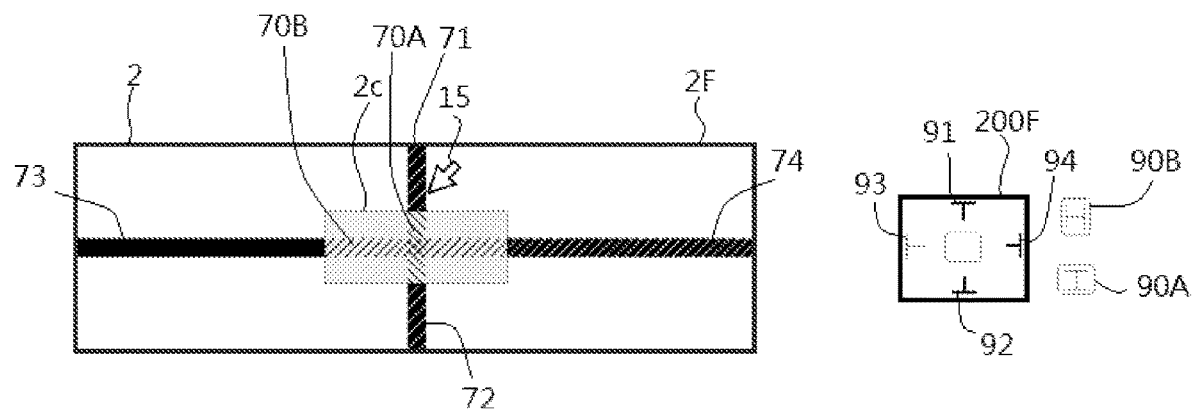

Now please refer to FIGS. 1 and 13A, the plurality of detection modules 20 further includes an eighth detection module 20h for detecting whether at least one of the object attribute line segments 70A and 70B and the distance attribute line segments 71, 72, 73 and 74 is selected. When the eighth detection module 20h detects that at least one of the object attribute line segments 70a and 70b and the distance attribute line segments 71, 72, 73 and 74 is selected, the setting module 18 changes the display attribute of the distance corresponding to the selected attribute line segment 70A, 70B, 71, 72, 73 and/or 74, and the display module 12 changes the color presented by the at least one selected attribute line segment 70A, 70B, 71, 72, 73 and/or 74. For example, as shown in FIG. 13A and FIG. 13B, when the distance attribute line segment 71 is clicked by a mouse cursor 15, the eighth detection module 20h detects that the distance attribute line segment 71 is selected. When the eighth detection module 20h detects that the distance attribute line segment 71 is selected, the setting module 18 changes the first fixed display attribute of the distance between the upper side of the outer frame 2F and the upper side of the object 2c to an extendable display attribute, and the display module 12 changes the first color (e.g., light blue) presented by the selected distance attribute line segment 71 (as shown in FIG. 13A) to the second color (e.g., pink) (as shown in FIG. 13B), wherein the second color (e.g., pink) represents the extendable display attribute. In this embodiment, when the first color (e.g., light blue) presented by the selected distance attribute line segment 71 changes to the second color (e.g., pink), the distance icon 91 correspondingly changes from the first color (e.g., light blue) to the second color (e.g., pink), so that the user can see the change of the display attribute of the distance between the upper side of the outer frame 2F and the upper side of the object 2c in the object attribute display area 36 in real time. When the setting module 18 changes the first fixed display attribute of the distance to the extendable display attribute, the logical unit length of the distance changes adaptively according to the length of a display displaying the programmable user interface 100. In this embodiment, after the color presented by the distance attribute line segment 71 changes to the second color (e.g., pink), if the distance attribute line segment 71 is clicked by the mouse cursor 15 again, the color presented by the distance attribute line segment 71 and the distance icon 91 may change back to the first color (e.g., light blue), and the setting module 18 changes the extendable display attribute of the distance back to the first fixed display attribute.

In one embodiment of the present disclosure, after the display attribute of the distance between the upper side of the outer frame 2F and the upper side of the object 2c changes to an extendable display attribute, the description code generation module 22 automatically generates the description code corresponding to the distance according to the changed display attribute of the distance, or generates the description code corresponding to the distance when the description code generation button 38a in FIG. 2 is selected (e.g., clicked or pressed). Taking the code in the above embodiment as an example, after the display attribute of the distance between the upper side of the outer frame 2F and the upper side of the object 2c changes from the first fixed display attribute to an extendable display attribute, the description code corresponding to the distance between the upper side of the outer frame 2F and the upper side of the object 2c will change as follows:

y="17fr30px14fr"

Compared with line 8 of the code in the above embodiment, the only difference is that the parameter defining the distance between the upper side of the outer frame 2F and the upper side of the object 2c in "y" has changed from "17px" to "17fr" to indicate that the display attribute of the distance between the upper side of the outer frame 2F and the upper side of the object 2c has changed from the first fixed display attribute to an extendable display attribute.

Figure 14A:
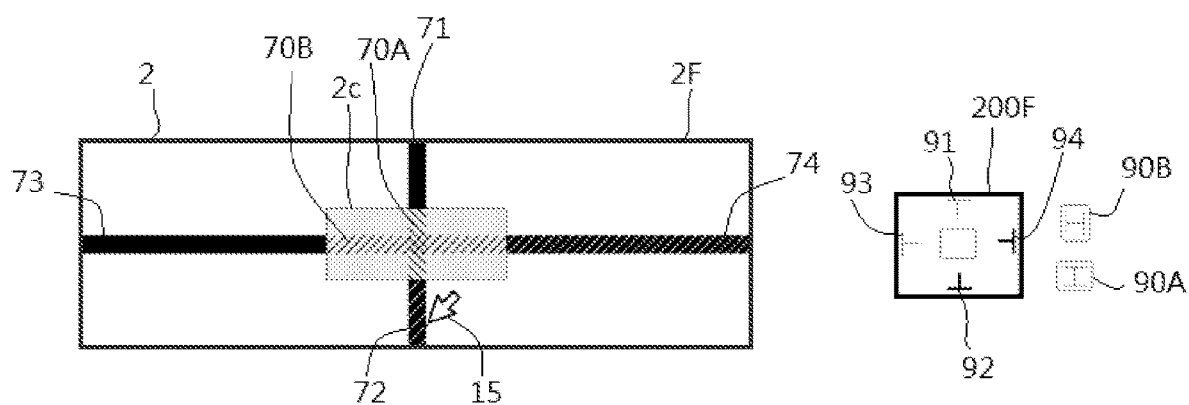
FIGS. 14A and 14B are schematic diagrams of setting display attributes for the distances between an object and the outer frame of its parent graphics layer according to another embodiment of the present disclosure.
Figure 14B:
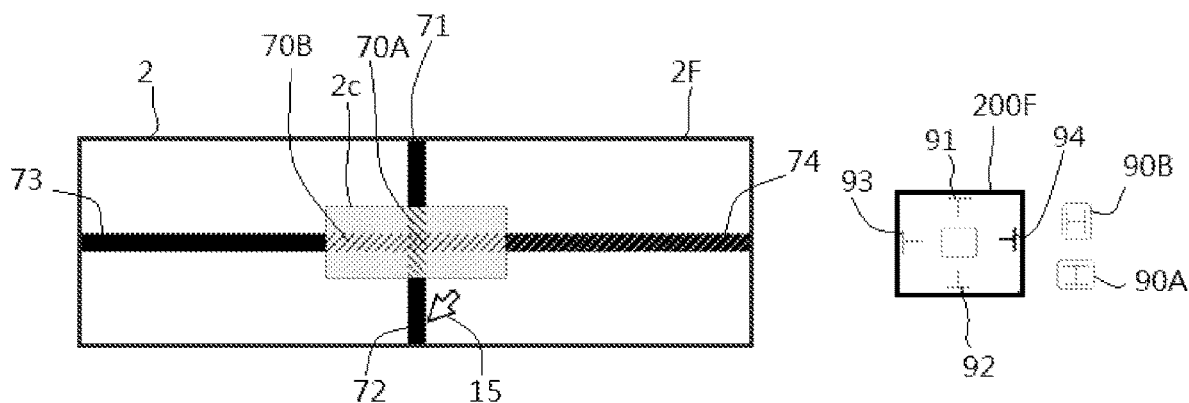

In another embodiment, as shown in FIG. 14A and FIG. 14B, when the distance attribute line segment 72 is clicked by a mouse cursor 15, the eighth detection module 20h detects that the distance attribute line segment 72 is selected. When the eighth detection module 20h detects that the distance attribute line segment 72 is selected, the setting module 18 changes the first extendable display attribute of the distance between the lower side of the outer frame 2F and the lower side of the object 2c to a fixed display attribute, and the display module 12 changes the second color (e.g., pink) presented by the selected distance attribute line segment 72 (as shown in FIG. 14A) to the first color (e.g., light blue) (as shown in FIG. 14B), wherein the first color (e.g., light blue) represents the fixed display attribute. In this embodiment, when the second color (e.g., pink) presented by the selected distance attribute line segment 72 changes to the first color (e.g., light blue), the distance icon 92 correspondingly changes from the second color (e.g., pink) to the first color (e.g., light blue), so that the user can see the change of the display attribute of the distance between the lower side of the outer frame 2F and the lower side of the object 2c in the object attribute display area 36 in real time. When the setting module 18 changes the first extendable display attribute of the distance to the fixed display attribute, the logical unit length of the distance is fixed and does not change adaptively according to the length of a display displaying the programmable user interface 100. In this embodiment, after the color presented by the distance attribute line segment 72 changes to the first color (e.g., light blue), if the distance attribute line segment 72 is clicked by the mouse cursor 15 again, the color presented by the distance attribute line segment 72 and the distance icon 92 may change back to the second color (e.g., pink), and the setting module 18 changes the fixed display attribute of the distance back to the first extendable display attribute.

In one embodiment of the present disclosure, after the display attribute of the distance between the lower side of the outer frame 2F and the lower side of the object 2c changes to a fixed display attribute, the description code generation module 22 automatically generates the description code corresponding to the distance according to the changed display attribute of the distance, or generates the description code corresponding to the distance when the description code generation button 38a in FIG. 2 is selected (e.g., clicked or pressed). Again, taking the code in the above embodiment as an example, after the display attribute of the distance between the lower side of the outer frame 2F and the lower side of the object 2c changes from the first extendable display attribute to a fixed display attribute, the description code corresponding to the distance between the lower side of the outer frame 2F and the lower side of the object 2c will change as follows:

y="17px30px14px"

Compared with line 8 of the code in the above embodiment, the only difference is that the parameter defining the distance between the lower side of the outer frame 2F and the lower side of the object 2c in "y" has changed from "14fr" to "14px" to indicate that the display attribute of the distance between the lower side of the outer frame 2F and the lower side of the object 2c has changed from the first extendable display attribute to a fixed display attribute.

Figure 15A:
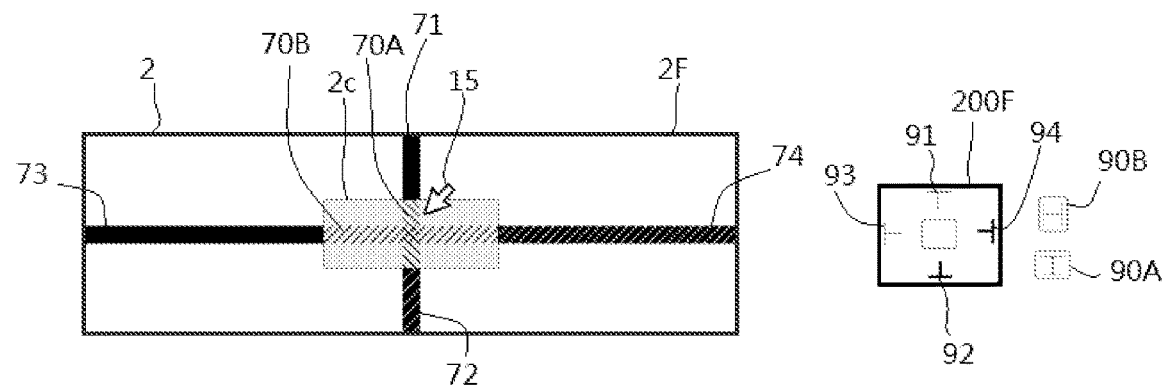
FIGS. 15A and 15B are schematic diagrams of setting display attributes for the distances between two corresponding sides of an object according to an embodiment of the present disclosure.
Figure 15B:
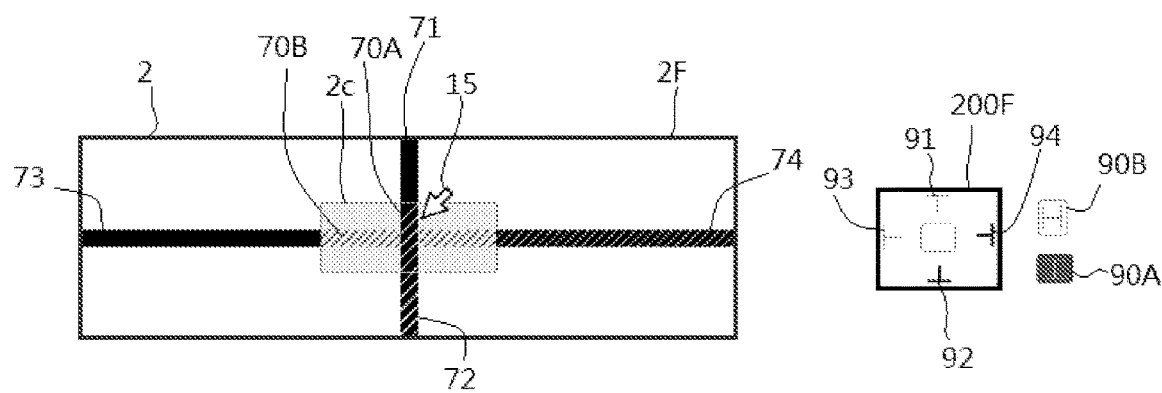

In another embodiment, as shown in FIG. 15A and FIG. 15B, when the object attribute line segment 70A is clicked by a mouse cursor 15, the eighth detection module 20h detects that the object attribute line segment 70A is selected. When the eighth detection module 20h detects that the object attribute line segment 70A is selected, the setting module 18 changes a third fixed display attribute of the distance (i.e., height) between the upper side and the lower side of the object 2c to an extendable display attribute, and the display module 12 changes the third color (e.g., blue) presented by the selected object attribute line segment 70A (as shown in FIG. 15A) to the second color (e.g., pink) (as shown in FIG. 15B), wherein the second color (e.g., pink) represents the extendable display attribute. In this embodiment, when the third color (e.g., blue) presented by the selected object attribute line segment 70A changes to the second color (e.g., pink), the object height icon 90A correspondingly changes from the third color (e.g., blue) to the second color (e.g., pink), so that the user can see the change of the display attribute of the distance (i.e., height) between the upper side and the lower side of the object 2c in the object attribute display area 36 in real time. When the setting module 18 changes the third fixed display attribute of the distance to the extendable display attribute, the logical unit length of the distance changes adaptively according to the length of a display displaying the programmable user interface 100. In this embodiment, after the color presented by the object attribute line segment 70A changes to the second color (e.g., pink), if the object attribute line segment 70A is clicked by the mouse cursor 15 again, the color presented by the object attribute line segment 70A and the object height icon 90A may change back to the third color (e.g., blue), and the setting module 18 changes the extendable display attribute of the distance back to the third fixed display attribute.

In one embodiment of the present disclosure, after the display attribute of the distance between the upper side and the lower side of the object 2c (i.e., the height of the object 2c) changes to an extendable display attribute, the description code generation module 22 automatically generates the description code corresponding to the distance according to the changed display attribute of the distance, or generates the description code corresponding to the distance when the description code generation button 38a in FIG. 2 is selected (e.g., clicked or pressed). Also taking the code in the above embodiment as an example, after the display attribute of the distance between the upper side and the lower side of the object 2c changes from the third fixed display attribute to an expandable display attribute, the description code corresponding to the distance between the upper side and the lower side of the object 2c will change as follows:

y="17px30fr14fr"

Compared with line 8 of the code in the above embodiment, the only difference is that the parameter defining the distance between the upper side and the lower side of the object 2c in "y" has changed from "30px" to "30fr" to indicate that the display attribute of the distance between the upper side and the lower side of the object 2c has changed from the third fixed display attribute to an extendable display attribute.

In another embodiment, the setting module 18 can set an expandable display attribute as the default display attribute of the distance (i.e., height) between the upper side and the lower side of the object 2c, and the display module 12 can display the object attribute line segment 70A presenting the second color (e.g., pink) to represent the expandable display attribute, and display the height icon 90A presenting the second color (e.g., pink and corresponding to the object attribute line segment 70A (as shown in FIG. 15B). The extendable display attribute of the distance (i.e., height) between the upper side and the lower side of the object 2c may also be changed to a fixed display attribute in the same manner as in the above embodiment, and the color presented by the object attribute line segment 70A and the height icon 90A may also be correspondingly changed in the same manner as in the above embodiment, which will not be repeatedly described here.

It should be understood that, in the embodiments of FIGS. 13A, 13B, 14A, 14B, 15A and 15B, the relationship between the object 2c and the corresponding grouping block 2 are taken as an example to illustrate setting or changing the display attributes of the width and the height of an object itself and the distances between its four sides and the four sides of its parent graphics layer. However, the system and the method disclosed in the present disclosure are not limited thereto, and for the other objects 2a, 2a, 4a-4d, 6a, 6b, 8a and 8b in FIG. 3A, all of the display attributes of the widths and the heights of those objects themselves and the distances between their four sides and the four sides of their parent graphics layers may be set in the same manner. However, when at least one side of an object is closely attached to at least one side of its parent graphics layer and there is no distance between those sides, it cannot be presented by the attribute line segments 71, 72, 73 and 74. In this case, at least one of the attribute line segments 71, 72, 73 and 74 may be replaced by other attribute symbols, such as the symbols "+" and "−," to represent two different display attributes, as shown in FIG. 16.

Figure 16:
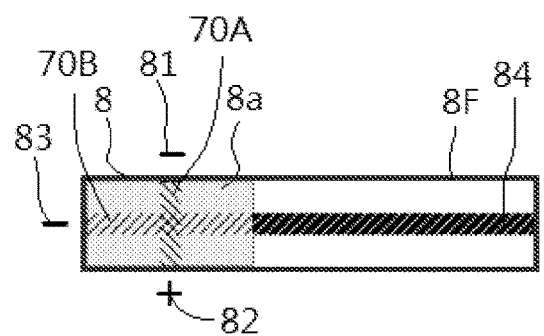
FIG. 16 is a schematic diagram of setting display attributes for the distances between an object and the outer frame of its parent graphics layer according to another embodiment of the present disclosure.

Now please refer to FIG. 1, FIG. 3A and FIG. 16. The seventh detection module 20g is further configured to detect whether the object 8a is selected. When the seventh detection module 20g detects that the object 8a is selected by a mouse cursor, a touch panel or a keyboard, the display module 12 displays two orthogonally intersecting object attribute line segments 70A and 70B on the object 8a, three distance attribute symbols 81, 82 and 83 on three sides of the object 8a, and a distance attribute line segment 84 between the right side of the object 8A and the right side of the outer frame 8F of the grouping block 8. The parent graphics layer of the object 8a is the grouping block 8, and the upper side, the left side and the lower side of the outer frame 8F of the grouping block 8 are respectively closely attached to the upper side, the left side and the lower side of the object 8a without any distance therebetween, so the display attributes of the distances between the upper side, the left side and the lower side of the outer frame 8F and the upper side, the left side and the lower side of the object 8a are respectively represented by symbols "−", "−" and "+". Similarly, the symbols "−" and "+" can be selected by the clicking of a mouse cursor to switch to different display attributes. For example, the symbol "−" can represent a fixed display attribute, and the symbol "+" can represent an extendable display attribute. Except for the difference in attribute elements, the other manners of operations are substantially the same as those disclosed in the embodiments of FIGS. 13A, 13B, 14A, 14B, 15A and 15B, and will not be repeatedly described herein.

Now please refer to FIGS. 1, 3A and 13A. When the seventh detection module 20g detects that the object 2c is selected by a mouse cursor, a touch panel, or a keyboard, the object 2a and the object 2b in the grouping block 2 or the objects in the other grouping blocks 4, 6 and 8 may be temporarily hidden or changed to their faded color (e.g., gray), so as to provide a concise image for the user to set the display attributes of the object 2c itself and the display attributes of the object 2c relative to the grouping block 2.

Figure 17A:
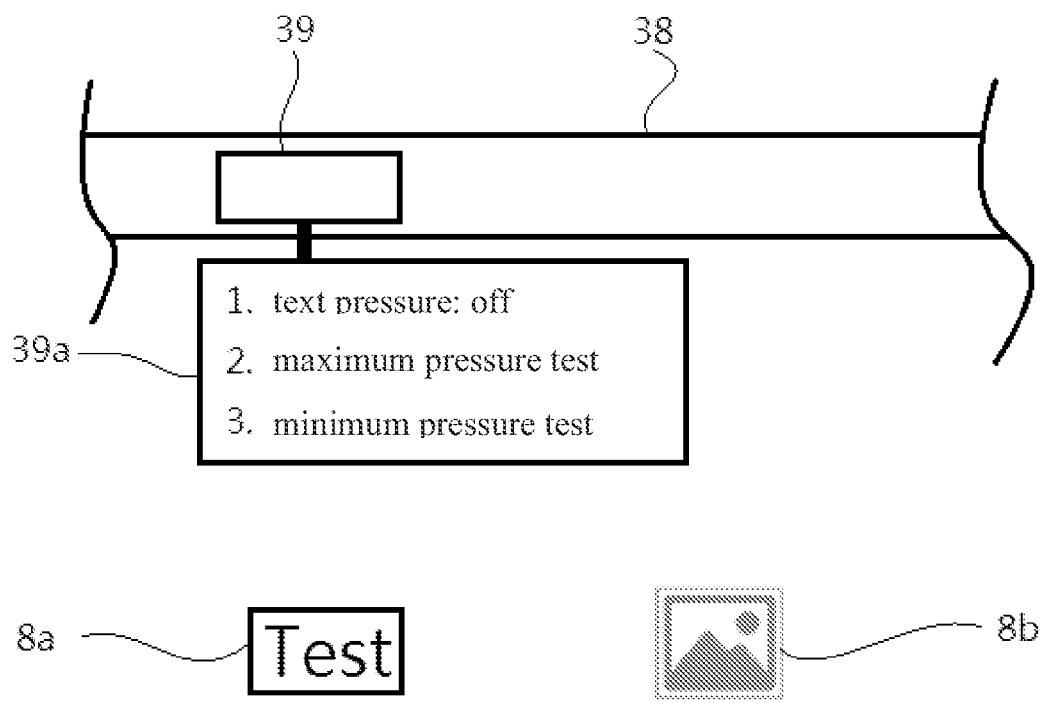
FIGS. 17A and 17B are schematic diagrams of a text stress test function in a system for generating a description code of a user interface according to an embodiment of the present disclosure.
Figure 17B:
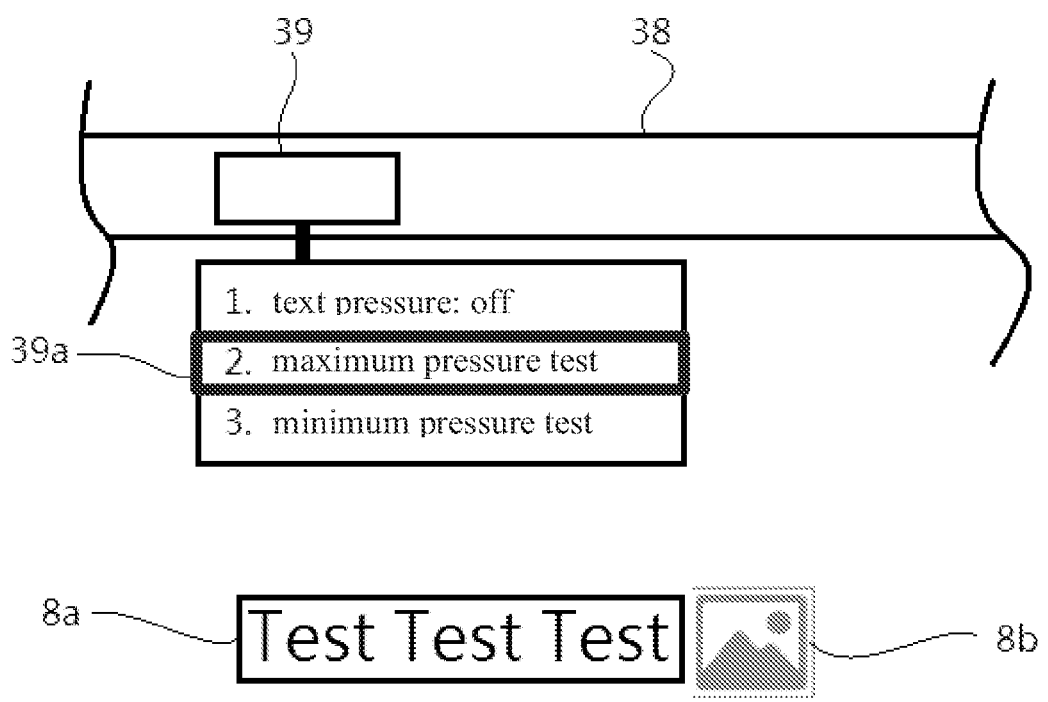

Now please refer to FIGS. 1, 2, 3A, 17A and 17B. In one embodiment, the tool bar 38 further provides a text length pressure test function 39 for testing the length limit of a text string. The length limit may be determined based on whether the text string is too long such that the text string overlaps with other objects, or whether the text string is too short such that the text string causes excessive blank. In this embodiment, when the text length pressure test function 39 is selected, the display module 12 displays a drop-down menu 39a containing options such as "text pressure: off", "maximum pressure test" and "minimum pressure test". The object 8a is a text string and the object 8b is an image. When the option "maximum stress test" is selected, the adjustment module 24 is configured to adjust the length of the string according to the content attribute of the text string, such that the length of the text string reaches the maximum limit, as shown in FIG. 17B. The plurality of detection modules 20 further includes a ninth detection module 20i for detecting whether the text string with the adjusted length overlaps with the object 8b. When the ninth detection module 20i detects that the text string with the adjusted length overlaps with the object 8b (as shown in FIG. 17B), the display module 12 displays a corresponding message or icon for notifying a user.

It should be understood that in the above embodiment, the first detection module 20a to the ninth detection module 20i may be implemented by nine independent detection modules, by at least two detection modules, or by the same detection program according to design requirements, all of which can achieve the purposes disclosed in the present disclosure.

Now please refer to FIGS. 1, 2, 4A and 18. In one embodiment of the present disclosure, the comparison module 26 is configured to overlap a first image 100a corresponding to the programmable user interface 100 before the cutting step (as shown in FIG. 2) with a second image 100b corresponding to the programmable user interface 100 after the cutting step (as shown in FIG. 4A) for comparing the differences between the two images, so that a designer can understand the differences and decide whether to continue editing or modifying the programmable user interface 100. In this embodiment, the tool bar 38 further includes a comparison button 41. When the comparison button 41 is selected or pressed, the display module 12 displays the first image 100a and the second image 100b for the designer's reference.

Figure 19:
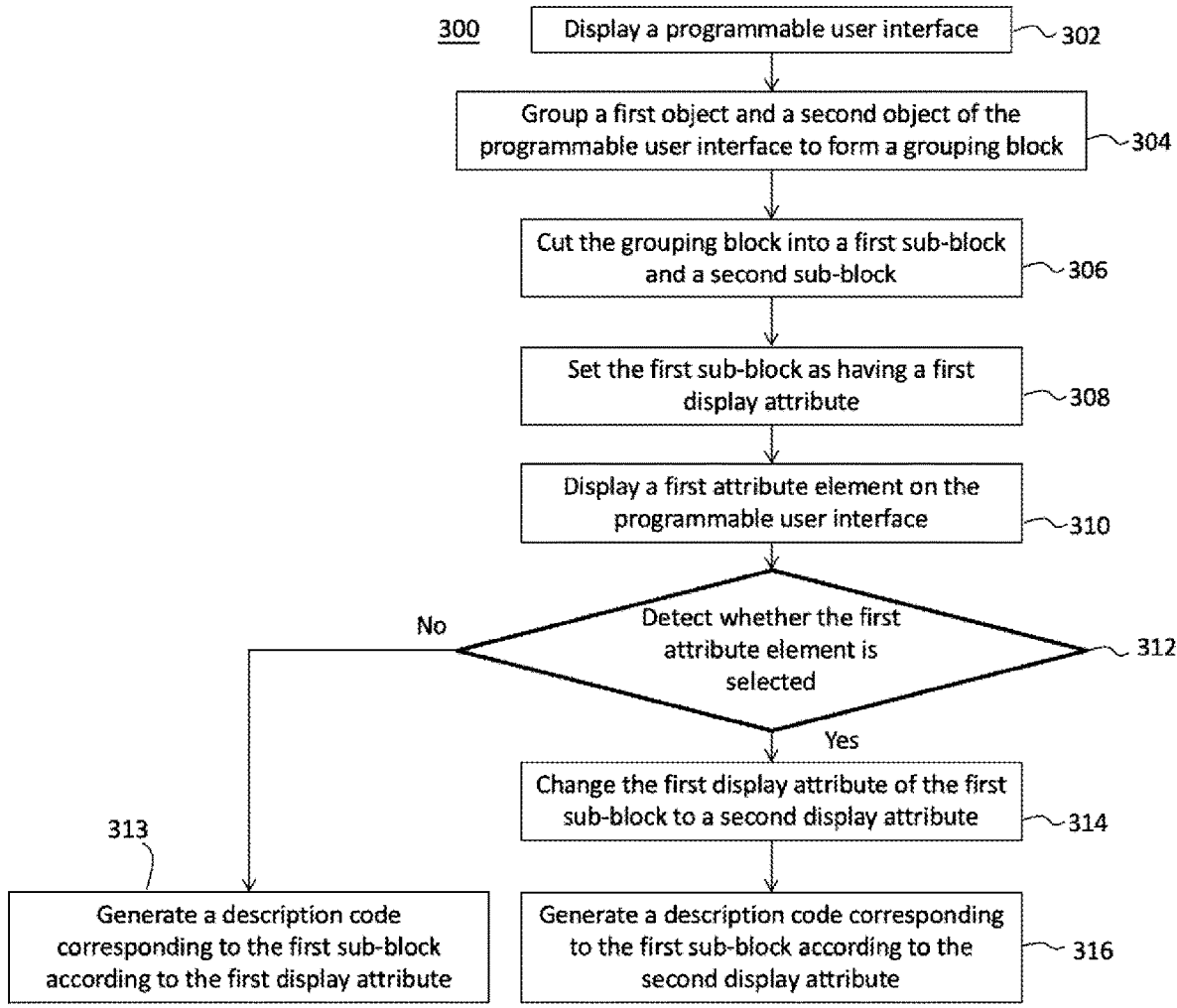
FIGS. 19 to 22 are flow charts of a method for generating a description code of a user interface according to some embodiments of the present disclosure.

FIG. 19 is a flow chart of a method 300 for generating a description code of a user interface according to some embodiments of the present disclosure. The method 300 includes steps S302-S316. In this embodiment, the steps S302-S316 in the method 300 are not limited to the order listed in the flow chart. Some steps may be performed simultaneously, performed in an order other than that listed in the flow chart, or simply omitted. Additional steps may be performed as required.

Now please refer to FIG. 19 in conjunction with FIG. 1, FIG. 3A, FIG. 4A, FIG. 6, FIGS. 8A-8D and FIGS. 9A and 9B. In step S302, the display module 12 displays a programmable user interface 100, which has a first object 8a and a second object 8b.

In step S304, the grouping module 14 groups the first object 8a and the second object 8b of the programmable user interface 100 to form a grouping block 8, wherein the first object 8a and the second object 8b are in the grouping block 8. In one embodiment, at least one of the plurality of detection modules 20 detects whether the grouping block 8 is in an area enclosed by the peripheral outline of an object 8c, as shown in FIG. 10. When at least one of the detection modules 20 detects that the grouping block 8 is in the area enclosed by the peripheral outline of the object 8c, the grouping module 14 groups the grouping block 8 and the object 8c into another grouping block 80. In another embodiment, at least one of the plurality of detection modules 20 detects whether an object 8d is in an area enclosed by a peripheral outline of the first object 8a, as shown in FIG. 11. When at least one of the detection modules 20 detects that the object 8d is in the area enclosed by the peripheral outline of the first object 8a, the grouping module 14 groups the object 8d and the first object 8a into another group 60. In other embodiments, at least one of the plurality of detection modules 20 detects whether an object 8e overlaps with an object 8f, as shown in FIG. 12. When at least one of the detection modules 20 detects that the object 8e overlaps with the object 8f, the grouping module 14 combines the object 8e and the object 8f into the first object 8a. In another embodiment, the first object 8a is a text string. The adjustment module 24 adjusts the length of the text string according to the content attribute of the text string. Further, at least one of the detection modules 20 detects whether the text string with the adjusted length overlaps with the second object 8b, as shown in FIG. 17B. When at least one of the detection modules 20 detects that the text string with the adjusted length overlaps with the second object 8b, the display module 12 displays a corresponding notification message.

In step S306, the cutting module 16 cuts the grouping block 8 into a first sub-block 11a and a second sub-block 11c, wherein the first object 8a is in the first sub-block 11a and the second object 8b is in the second sub-block 11c, as shown in FIG. 6. In one embodiment, at least one of the plurality of detection modules 20 detects whether an interval 9a exists between the first object 8a and the second object 8b, wherein the interval 9a is defined by a first edge of the first object 8a and a second edge of the second object 8b. When at least one of the detection modules 20 detects that the interval 9a exists between the first object 8a and the second object 8b, the cutting module 16 may cut the grouping blocks 8 into the first sub-block 11a and the second sub-block 11c along at least one path in the interval 9a, as shown in FIG. 6. Preferably, the at least one path includes a first path and a second path. The first path is adjacent to the first edge of the first object 8a. The second path is adjacent to the second edge of the second object 8b. The cutting module 16 can cut the grouping block 8 into the first sub-block 11a, the second sub-block 11c and a third sub-block 11b along the first path and the second path, wherein the third sub-block 11b is between the first sub-block 11a and the second sub-block 11c, as shown in FIG. 6. In another embodiment, when at least one of that detection modules 20 detects the interval 9a exists between the first object 8a and the second object 8b, the display module 12 display a confirmation button 52 (as shown in FIG. 5). Next, at least one of the detection modules 20 further detects whether the confirm button 52 is selected. When at least one of the detection modules 20 detects that the confirmation button 52 is selected, the cutting module 16 may cut the grouping block 8 into the first sub-block 11a and the second sub-block 11c along at least one path in the interval 9a.

In step S308, the setting module 18 sets the first sub-block 11a as having a first display attribute.

In step S310, the display module 12 displays a first attribute element on the programmable user interface 100, wherein the first attribute element presents a first display state to represent the first display attribute. In one embodiment, the first attribute element may be an attribute line segment 13a positioned on the first sub-block 11a, and the first display state may present a first color (e.g., yellow), as shown in FIG. 8A. In another embodiment, the first attribute element may be an attribute line segment 13a positioned on an outer edge the first sub-block 11a, and the first display state may present a first color (e.g., yellow), as shown in FIG. 9A. In other embodiments, the first attribute element may be an attribute switch 17a positioned on an outer edge of the first sub-block 11a, as shown in FIG. 9B.

In step S312, at least one of the plurality of detection modules 20 detects whether the first attribute element (e.g., the attribute line segment 13a) is selected, as shown in FIG. 8A. When at least one of the detection modules 20 does not detect that the first attribute element (e.g., the attribute line segment 13a) is selected, execute step S313. When at least one of the detection modules 20 detects that the first attribute element (e.g., the attribute line segment 13a) is selected, execute step S314.

In step S313, the description code generation module 22 generates a first description code corresponding to the first sub-block 11a according to the first display attribute.

In step S314, change the first display attribute of the first sub-block 11a to a second display attribute, and change the first display state (e.g., yellow) of the first attribute element (e.g., the attribute line segment 13a) to a second display state (e.g., green), wherein the second display state is used to represent the second display attribute. In one embodiment, the first display attribute is a fixed display attribute, and the second display attribute is an extendable display attribute. When the setting module 18 sets the first sub-block 11a as having the fixed display attribute, the logical unit length of the first sub-block 11a is fixed and does not change adaptively according to the length of a display displaying the programmable user interface 100. When the fixed display attribute of the first sub-block 11a is changed to the extendable display attribute, the logical unit length of the first sub-block 11a changes adaptively according to the length of a display displaying the programmable user interface 100. In another embodiment, the first display attribute is an extendable display attribute, and the second display attribute is a fixed display attribute. When the setting module 18 sets the first sub-block 11a as having the extendable display attribute, the logical unit length of the first sub-block 11a changes adaptively according to the length of a display displaying the programmable user interface 100. When the extendable display attribute of the first sub-block 11a is changed to the fixed display attribute, the logical unit length of the first sub-block 11a is fixed and does not change adaptively according to the length of a display displaying the programmable user interface 100.

In step S316, the description code generation module 22 generates a first description code corresponding to the first sub-block 11a according to the second display attribute.

Figure 20:
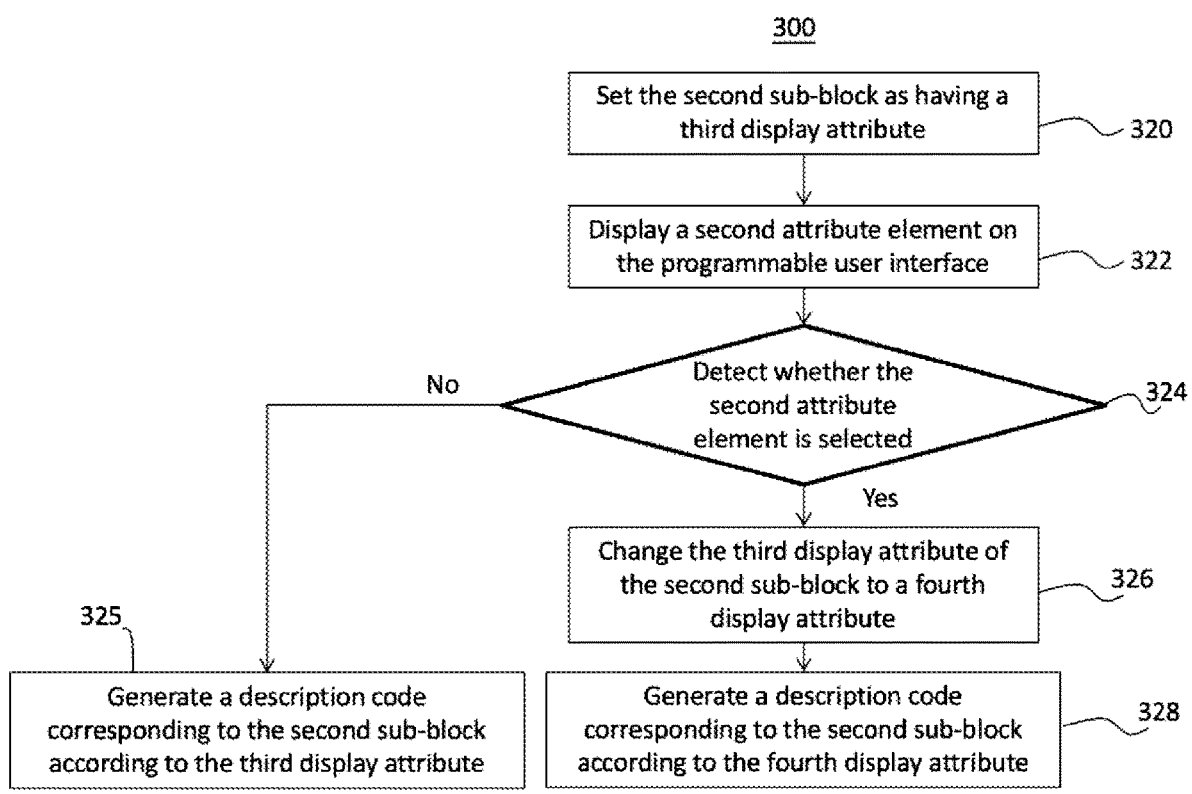

Now please refer to FIG. 20. In another embodiment, the method 300 may further include steps S320-S328 for generating a description code corresponding to the second sub-block 11c. The steps S320 to S328 may be performed after step S316, or before step S316, or partially before step S316.

Now please refer to FIG. 20, together with reference to FIGS. 1, 3A, 4A, 6, 8A-8D, 9A and 9B. In step S320, the setting module 18 sets the second sub-block 11c as having a third display attribute.

In step S322, the display module 12 displays a second attribute element on the programmable user interface 100, wherein the second attribute element presents a third display state to represent the third display attribute. In one embodiment, the second attribute element may be an attribute line segment 13c positioned on the second sub-block 11c, and the third display state may present a first color (e.g., yellow), as shown in FIG. 8A. In another embodiment, the second attribute element may be an attribute line segment 13c positioned on an outer edge of the second sub-block 11c, and the third display state may present a first color (e.g., yellow), as shown in FIG. 9A. In other embodiments, the second attribute element may be an attribute switch 17c positioned on an outer edge of the second sub-block 11c, as shown in FIG. 9B.

In step S324, at least one of the plurality of detection modules 20 detects whether the second attribute element (e.g., the attribute line segment 13c) is selected. When at least one of the detection modules 20 does not detect that the second attribute element (e.g., the attribute line segment 13c) is selected, execute step S325. When at least one of the detection modules 20 detects that the second attribute element (e.g., the attribute line segment 13c) is selected, execute step S326.

In step S325, the description code generation module 22 generates a second description code corresponding to the second sub-block 11c according to the third display attribute.

In step S326, change the third display attribute of the second sub-block 11c to a fourth display attribute, and change the third display state (e.g., yellow) presented by the second attribute element (e.g., the attribute line segment 13c) to a fourth display state (e.g., green), wherein the fourth display state is used to represent the fourth display attribute. In one embodiment, that third display attribute is a fixed display attribute, and the fourth display attribute is an extendable display attribute. In another embodiment, that third display attribute is an extendable display attribute, and the fourth display attribute is a fixed display attribute. Similarly, the definition of the fixed display attribute and the extendable display attribute of the second sub-block 11c is the same as that of the first sub-block 11a, and therefore the description thereof is omitted here.

In step S328, the description code generation module 22 generates a second description code corresponding to the second sub-block 11c according to the fourth display attribute.

Figure 21:
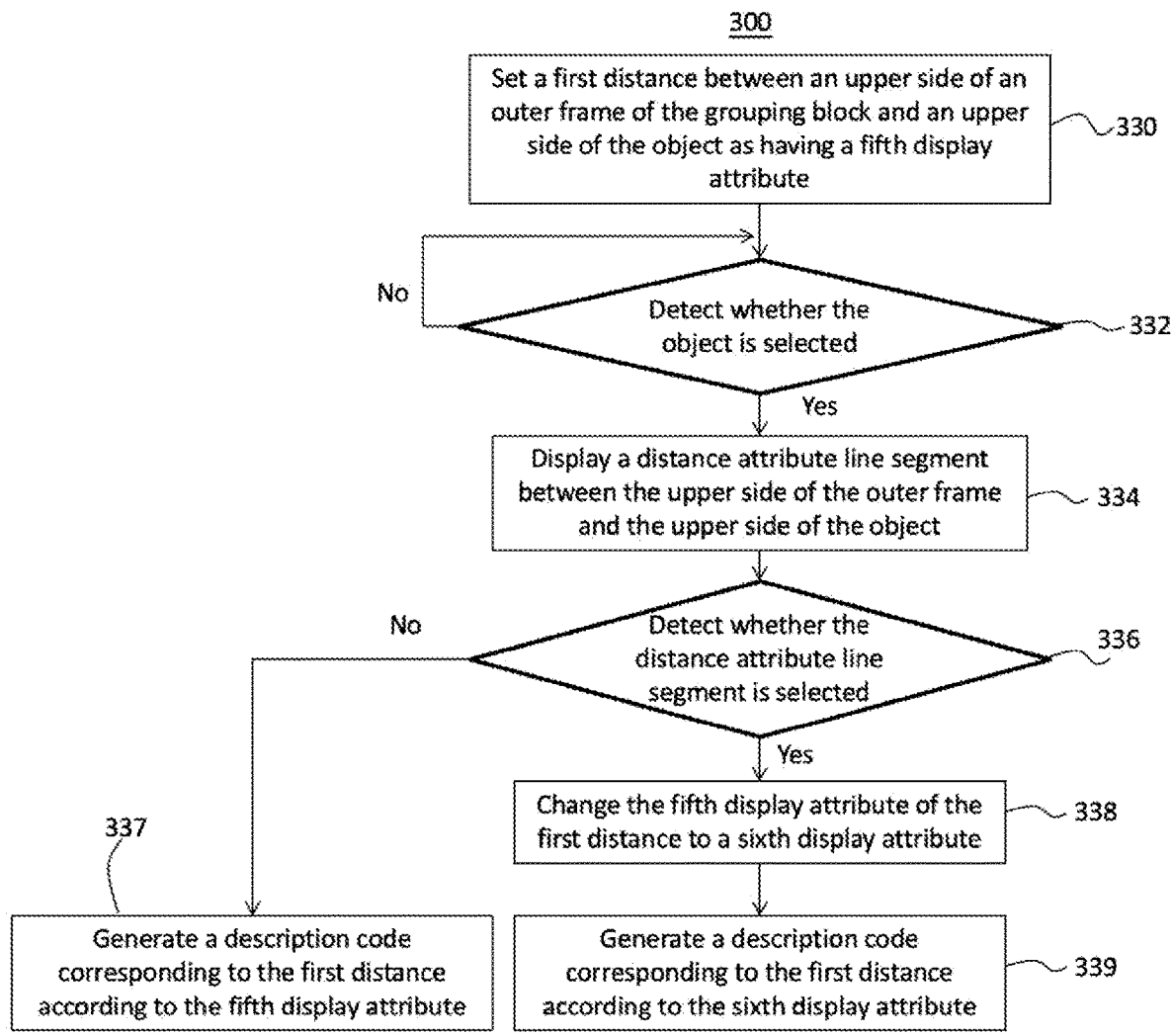

Now please refer to FIG. 21. In another embodiment, the method 300 may further include steps S330-S339 for generating a description code of display attributes corresponding to distances between sides of an object and sides of an outer frame of a grouping block corresponding to the object. The steps S330 to S339 may be performed after step S328, or before step S328, or partially before step S328. In this embodiment, the distance between the upper side of the object 2c and the upper side edge of the outer frame 2F of the grouping block 2 in FIGS. 13A and 13B will be described as an example.

Now please refer to FIG. 21, together with reference to FIGS. 13A and 13B. In step 330, the setting module 18 sets a first distance between the upper side of the outer frame 2F of the grouping block 2 and the upper side of the object 2c as having a fifth display attribute.

In step S332, at least one of the plurality of detection modules 20 detects whether the object 2c is selected. When at least one of the plurality of detection modules 20 does not detect that the object 2c is selected, repeatedly execute step S332. When at least one of the plurality of detection modules 20 detects that the object 2c is selected, execute step S334.

In step S334, the display module 12 displays a distance attribute line segment 71 between the upper side of the outer frame 2F and the upper side of the object 2c, wherein the distance attribute line segment 71 presents a fifth display state (e.g., light blue) for representing the fifth display attribute, as shown in FIG. 13A.

In step S336, at least one of the plurality of detection modules 20 detects whether the distance attribute line segment 71 is selected. When at least one of the detection modules 20 does not detect that the distance attribute line segment 71 is selected, execute step S337. When at least one of the detection modules 20 detects that the distance attribute line segment 71 is selected, execute step S338.

In step S337, the description code generation module 22 generates a third description code corresponding to the first distance according to the fifth display attribute.

In step S338, change the fifth display attribute of the first distance to a sixth display attribute, and change the fifth display state (e.g., light blue) presented by the distance attribute line segment 71 to a sixth display state (e.g., pink), wherein the sixth display state (e.g., pink) is used to represent the sixth display attribute, as shown in FIG. 13B. In one embodiment, the fifth display attribute is a fixed display attribute, and the sixth display attribute is an extendable display attribute. When the setting module 18 sets the first distance as having the fixed display attribute, the logical unit length of the first distance is fixed and does not change adaptively according to the length of a display displaying the programmable user interface 100. When the fixed display attribute of the first distance is changed to the extendable display attribute, the logical unit length of the first distance changes adaptively according to the length of a display displaying the programmable user interface 100. In another embodiment, the fifth display attribute is an extendable display attribute, and the sixth display attribute is a fixed display attribute. When the setting module 18 sets the first distance as having the extendable display attribute, the logical unit length of the first distance changes adaptively according to the length of a display displaying the programmable user interface 100. When the extendable display attribute of the first distance is changed to the fixed display attribute, the logical unit length of the first distance is fixed and does not change adaptively according to the length of a display displaying the programmable user interface 100. In other embodiments, the fifth display state is a first color (e.g., light blue) and the sixth display state is a second color (e.g., pink). The display module 12 displays the programmable user interface 100 on the edit display area 34 and displays a distance icon 91 on the object attribute display area 36 in FIG. 2, wherein the distance icon 91 corresponds to the distance attribute line segment 71, and the distance icon 91 presents a third color (e.g., light blue), which is substantially the same as the first color (e.g., light blue). When the first color (e.g., light blue) presented by the distance attribute line segment 71 changes to the second color (e.g., pink), the distance icon 91 correspondingly changes from the third color (e.g., light blue) to a fourth color (e.g., pink), wherein the fourth color (e.g., pink) is substantially the same as the second color (e.g., pink).

In step S339, the description code generation module 22 generates a third description code corresponding to the first distance according to the sixth display attribute.

Figure 22:
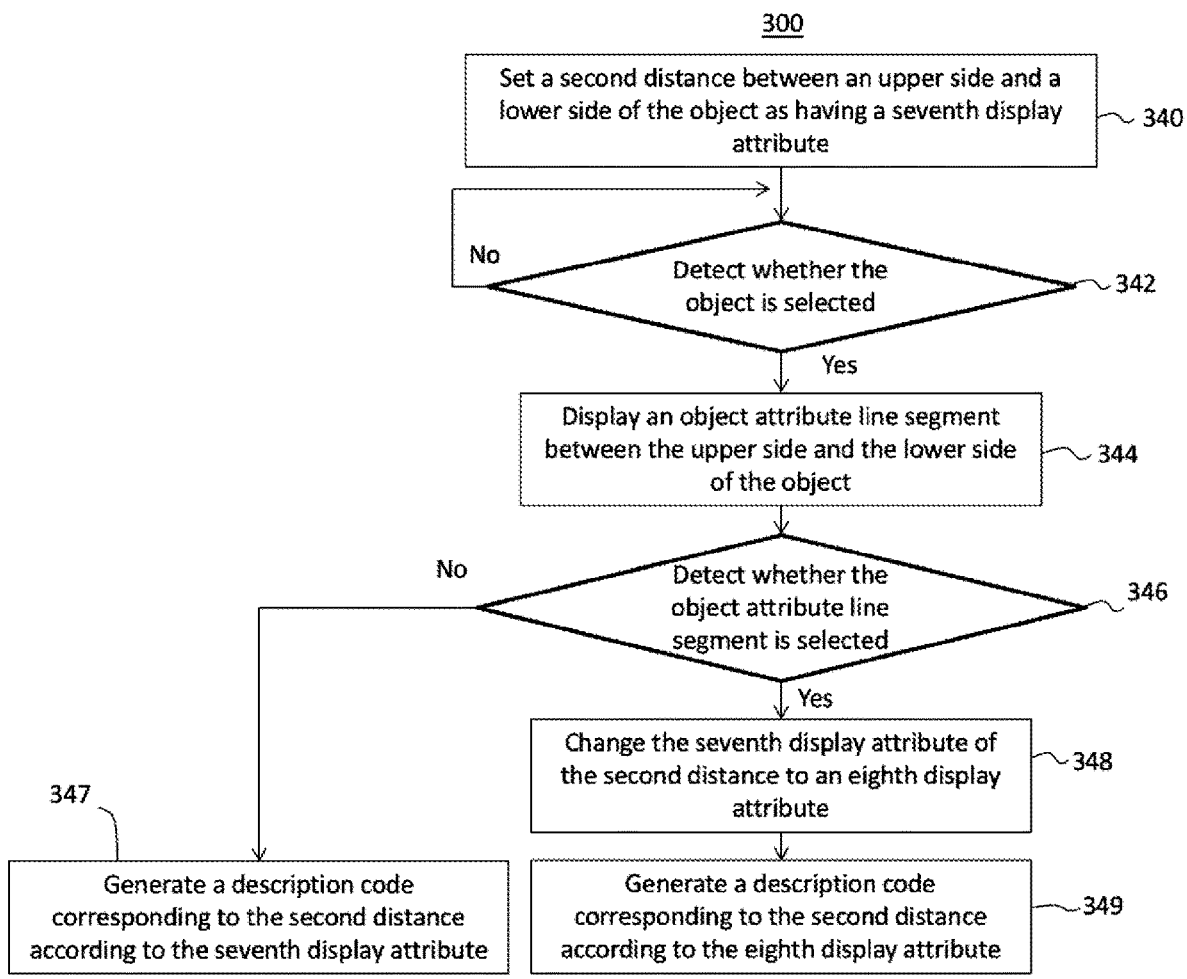

Now please refer to FIG. 22. In another embodiment, the method 300 may further include steps S340-S349 for generating a description code of a display attribute corresponding to a distance between two corresponding sides of an object. The steps S340-S349 may be performed after step S339, or before step S339, or partially before step S339. In this embodiment, the distance between the upper side and the lower side of the object 2c in FIGS. 15A and 15B will be described as an example.

Now please refer to FIG. 22, together with reference to FIGS. 15A and 15B. In step S340, the setting module 18 sets a second distance between the upper side and the lower side of the object 2c as having a seventh display attribute.

In step S342, at least one of the plurality of detection modules 20 detects whether the object 2c is selected. When at least one of the plurality of detection modules 20 does not detect that the object 2c is selected, repeatedly execute step S342. When at least one of the plurality of detection modules 20 detects that the object 2c is selected, execute step S344.

In step S344, the display module 12 further displays an object attribute line segment 70A between the upper side and the lower side of the object 2c, wherein the object attribute line segment 70A presents a seventh display state (e.g., blue) for representing the seventh display attribute, as shown in FIG. 15A.

In step S346, at least one of the plurality of detection modules 20 detects whether the object attribute line segment 70A is selected. When at least one of the detection modules 20 does not detect that the object attribute line segment 70A is selected, execute step S347. When at least one of the detection modules 20 detects that the object attribute line segment 70A is selected, execute step S348.

In step S348, change the seventh display attribute of the second distance to an eighth display attribute, and change the seventh display state (e.g., blue) presented by the object attribute line segment 70A to an eighth display state (e.g., pink), wherein the eighth display state (e.g., pink) is used to represent the eighth display attribute, as shown in FIG. 15B. In one embodiment, the seventh display attribute is a fixed display attribute, and the eighth display attribute is an extendable display attribute. When the setting module 18 sets the second distance as having the fixed display attribute, the logical unit length of the second distance is fixed and does not change adaptively according to the length of a display displaying the programmable user interface 100. When the fixed display attribute of the second distance is changed to the extendable display attribute, the logical unit length of the second distance changes adaptively according to the length of a display displaying the programmable user interface 100. In another embodiment, the seventh display attribute is an extendable display attribute, and the eighth display attribute is a fixed display attribute. When the setting module 18 sets the second distance as having the extendable display attribute, the logical unit length of the second distance changes adaptively according to the length of a display displaying the programmable user interface 100. When the extendable display attribute of the second distance is changed to the fixed display attribute, the logical unit length of the second distance is fixed and does not change adaptively according to the length of a display displaying the programmable user interface 100. In other embodiments, the seventh display state is a first color (e.g., blue) and the eighth display state is a second color (e.g., pink). The display module 12 displays the programmable user interface 100 on the edit display area 34 and displays an object height icon 90A on the object attribute display area 36, wherein the object height icon 90A corresponds to the object attribute line segment 70A, and the object height icon 90A presents a third color (e.g., blue), which is substantially the same as the first color (e.g., blue). When the first color (e.g., blue) presented by the object attribute line segment 70A changes to the second color (e.g., pink), the object height icon 90A correspondingly changes from the third color (e.g., blue) to a fourth color (e.g., pink), wherein the fourth color (e.g., pink) is substantially the same as the second color (e.g., pink).

In step S349, the description code generation module 22 generates a fourth description code corresponding to the second distance according to the eighth display attribute.

Figure 18:
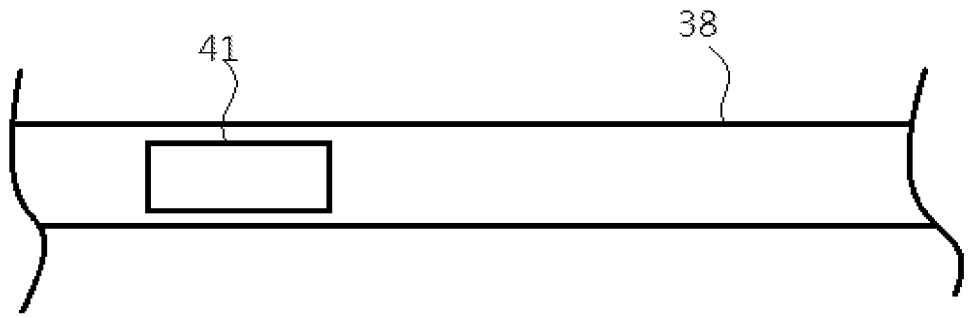
FIG. 18 is a schematic diagram of an image comparison function in a system for generating a description code of a user interface according to an embodiment of the present disclosure.
Figure 18:
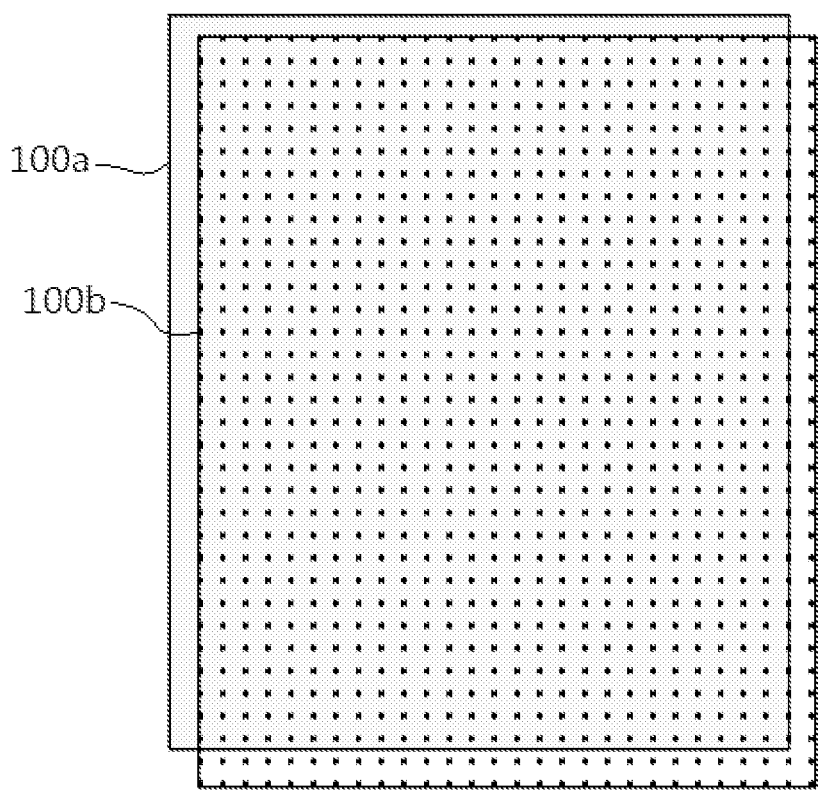

In one embodiment of the present disclosure, the method 300 further includes a step of overlapping an image 100a corresponding to the programmable user interface 100 before a cutting step with an image 100b corresponding to the programmable user interface 100 after the cutting step for comparing the differences between the two images, as shown in FIG. 18.

Figure 23:
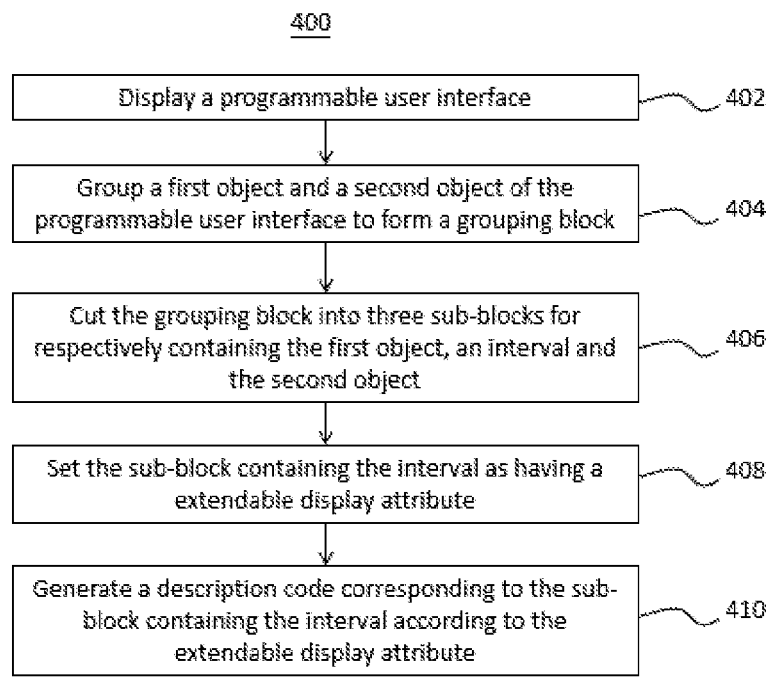
FIG. 23 is a flow chart of a method for generating a description code of a user interface according to another embodiment of the present disclosure.

FIG. 23 is a flow chart of a method 400 for generating a description code of a user interface according to some embodiments of the present disclosure. The method 400 includes steps S402-S410. In this embodiment, the steps S402-S410 in the method 400 are not limited to the order listed in the flow chart. Some steps may be performed simultaneously, performed in an order other than that listed in the flow chart, or simply omitted. Additional steps may be performed as required. In this embodiment, the object 8a and the object 8b in FIGS. 3A, 4A and 6 will be described as an example.

Now please refer to FIG. 23, in conjunction with reference to FIGS. 1, 3A, 4A and 6. In step S402, the display module 12 displays a programmable user interface 100 having a first object 8a and a second object 8b, and there is an interval 9a between the first object 8a and the second object 8b.

In step S404, the grouping module 14 groups the first object 8a and the second object 8b to form a grouping block 8, wherein the first object 8a and the second object 8b are in the grouping block 8.

In step S406, the cutting module 16 cuts the grouping block 8 into a sub-block 11a, a sub-block 11b and a sub-block 11c, wherein the first object 8a is in the sub-block 11a, the second object 8b is in the sub-block 11c and the interval 9a is in the sub-block 11b, wherein the interval 9a is defined by a right edge of the first object 8a and a left edge of the second object 8b, as shown in FIG. 6. In one embodiment, at least one of the plurality of detection modules 20 detects whether the width of the interval 9a is larger than a preset value. When at least one of the detection modules 20 detects that the width of the interval 9a is larger than the preset value, the cutting module 16 may cut the grouping block 8 into the sub-block 11a, the sub-block 11b and the sub-block 11c along a first path and a second path in the interval 9a, wherein the first path is adjacent to the right edge of the first object 8a and the second path is adjacent to the left edge of the second object 8b, as shown in FIG. 6.

In step S408, the setting module 18 sets the sub-block 11b as having a first display attribute. In this embodiment, the first display attribute is an extendable display attribute, such that the logical unit length of the sub-block 11b changes adaptively according to the length of a display displaying the programmable user interface 100. In another embodiment, the setting module 18 further sets the sub-block 11a and the sub-block 11c as having a second display attribute (e.g., a fixed display attribute), such that the logical unit lengths of the sub-block 11a and the sub-block 11c are fixed and does not change adaptively according to the length of a display displaying the programmable user interface 100. In another embodiment, the setting module 18 further sets the sub-block 11a or the sub-block 11c as having a third display attribute (e.g., extendable display attribute), such that the logical unit length of the sub-block 11a or the sub-block 11c changes adaptively according to the length of the display displaying the programmable user interface 100.

In step S410, the description code generation module 22 generates a first description code corresponding to the sub-block 11b according to the first display attribute (i.e., the extendable display attribute). In another embodiment, the description code generation module 22 further generates a second description code corresponding to the sub-block 11a and the sub-block 11c according to the second display attribute. In another embodiment, the description code generation module 22 further generates a third description code corresponding to the sub-block 11a or the sub-block 11c according to the third display attribute.

Another embodiment of the present disclosure discloses a non-transitory computer-readable storage medium for storing at least one program including a plurality of instructions that, when executed by at least one computer, result in a plurality of operations corresponding to the steps of the method 300 and the method 400 in the embodiments described above.

Figure 24A:
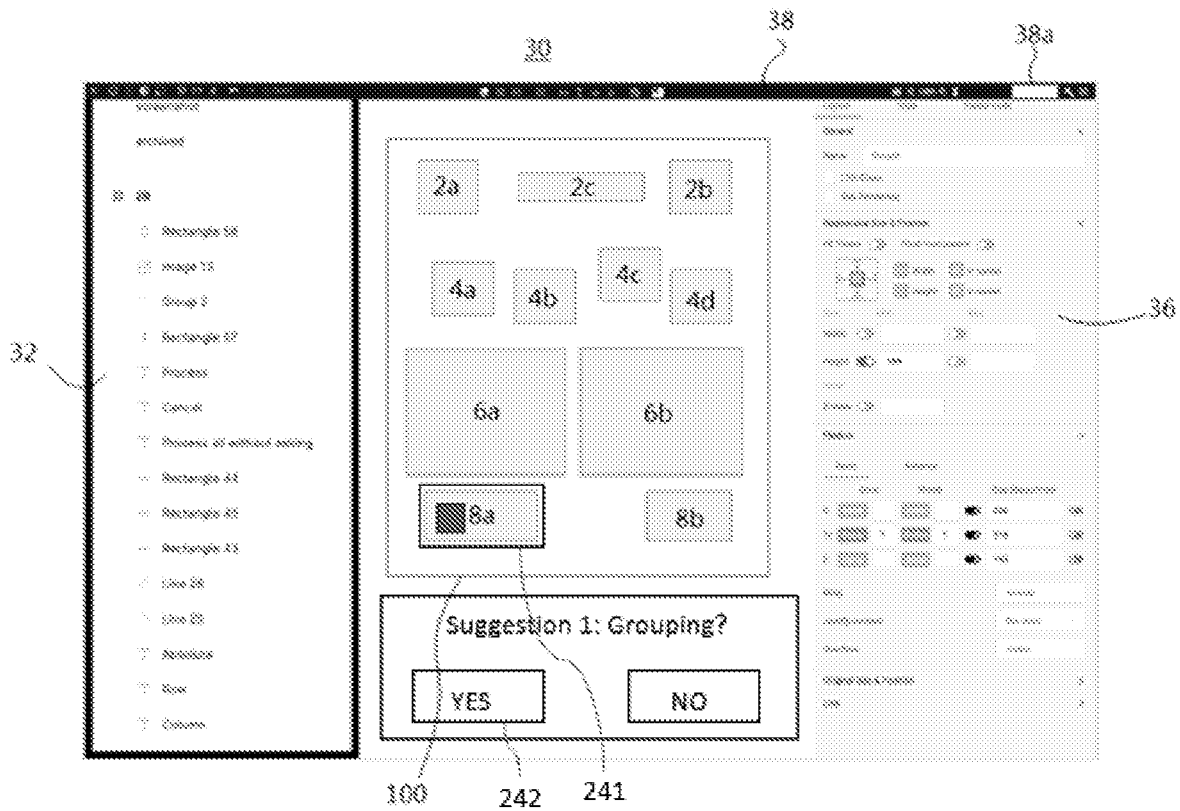
FIGS. 24A-24C are schematic diagrams of an operation interface of a system for generating a description code of a user interface according to an embodiment of the present disclosure.
Figure 24B:
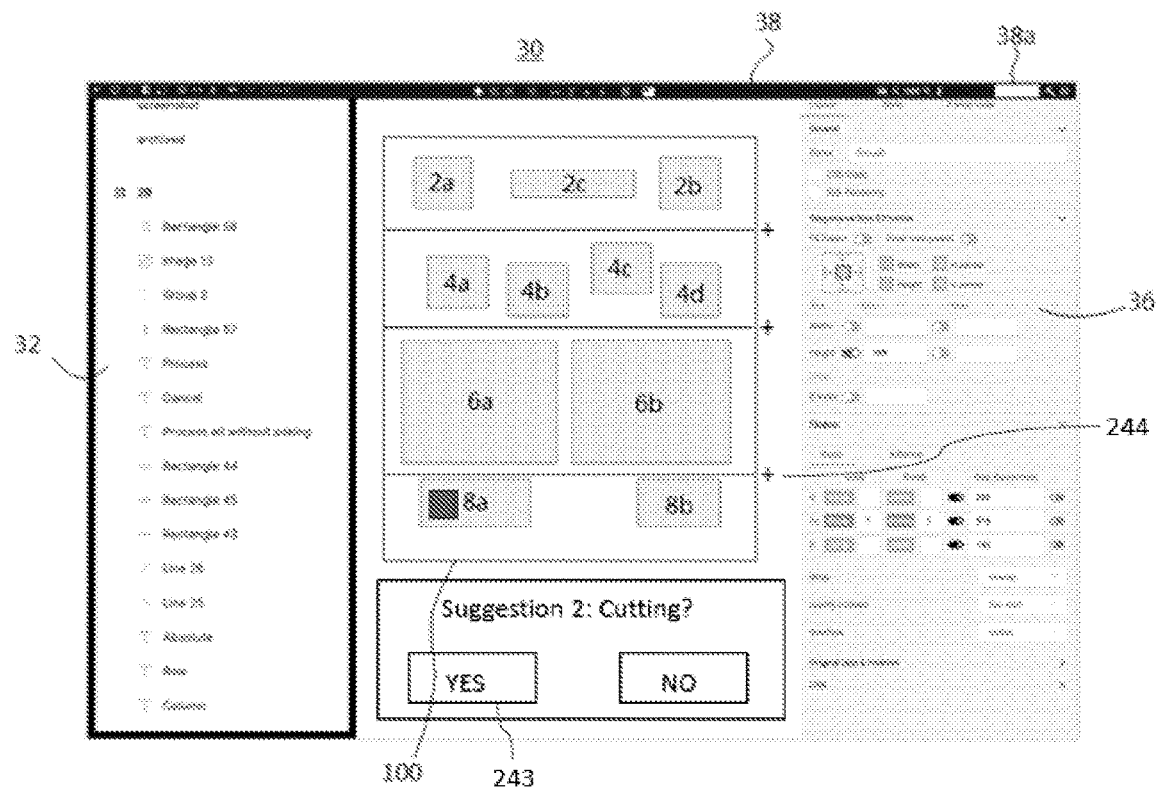
Figure 24C:
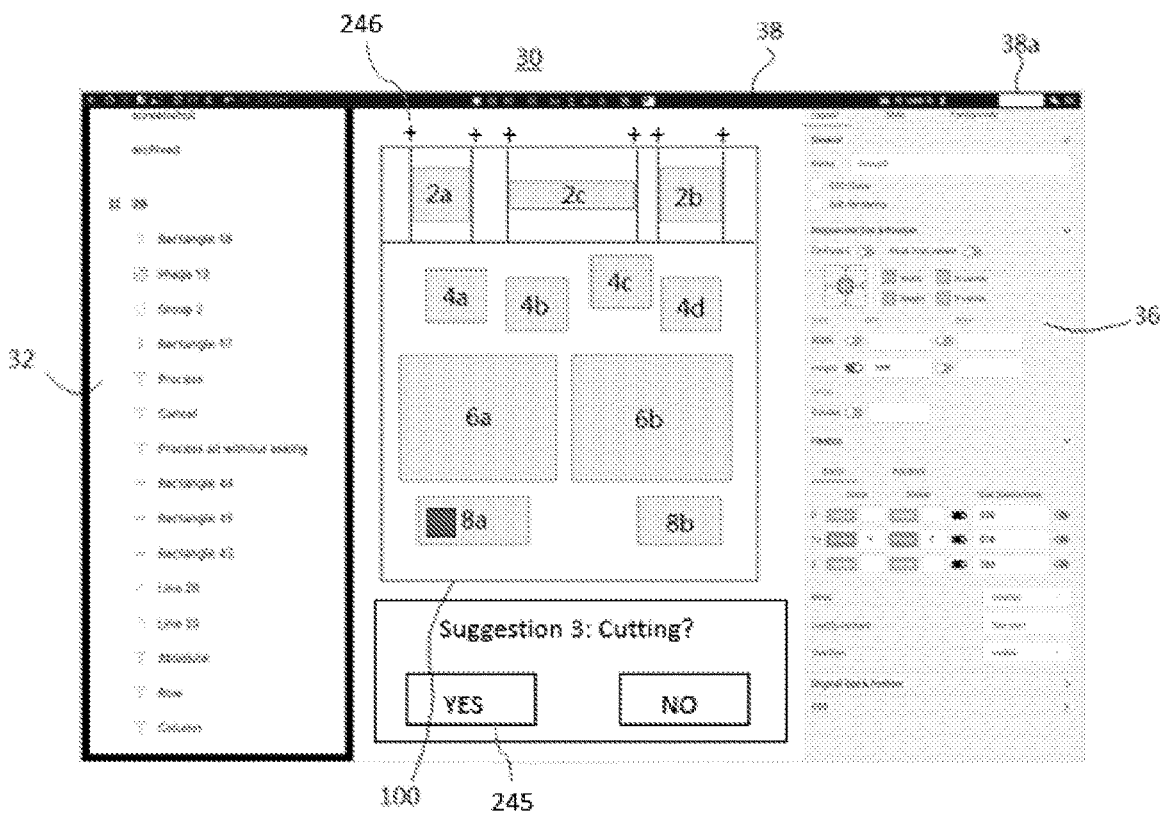

FIGS. 24A-24C are schematic diagrams of an operation interface 30 of a system for generating a description code of a user interface according to another embodiment of the present disclosure. In this embodiment, the operation interface 30 can provide suggestions regarding the programmable user interface 100. FIGS. 24A-24C show three examples of such suggestions, respectively.

In FIG. 24A, the fourth detection module 20d or the fifth detection module 20e can detect whether there is any grouping block or object in the area enclosed by the peripheral outline of another object. For example, the programmable user interface 100 has an object 241 having a peripheral outline and the fourth detection module 20d or the fifth detection module 20e detects that the object 8a is in the area enclosed by the peripheral outline of the object 241. In response, the display module 12 displays a message box having a confirmation button 242 for the user to confirm whether to group the object 8a and the object 241. The second detection module 20b detects whether the confirmation button 242 is selected. When the second detection module 20b detects that the confirm button 242 is selected, the grouping module 14 groups the object 8a and the object 241 into another grouping block.

Similarly, in the case that the fourth detection module 20d or the fifth detection module 20e detects that a grouping block is in the area enclosed by the peripheral outline of the object 241, the display module 12 displays a message box having a confirmation button 242 for the user to confirm whether to group the grouping block and the object 241. The second detection module 20b detects whether the confirmation button 242 is selected. When the second detection module 20b detects that the confirm button 242 is selected, the grouping module 14 groups the grouping block and the object 241 into another grouping block.

In an embodiment, instead of automatically grouping the objects of the programmable user interface 100 to form grouping blocks as shown in FIGS. 3A and 3B, the user can see a suggestion first and then confirm whether to group (or cut) the objects as suggested. For example, as shown in FIG. 24B, the display module 12 provides a suggestion by displaying a plurality of paths dividing the objects into a plurality of groups according to the arrangement of the objects. The objects 2a, 2b and 2c belong to the first group. The objects 4a, 4b, 4c and 4d belong to the second group. The objects 6a and 6b belong to the third group. The objects 8a and 8b belong to the fourth group.

The display module 12 also displays a plurality of cutting switches adjacent to the paths, wherein each cutting switch corresponds to one path. For example, the cutting switch 244 is adjacent to and corresponds to the lowermost path. The detection modules 20 may include a detection module for detecting whether any one cutting switch is selected. When the detection module detects that any one cutting switch is selected, the display module 12 switches the path corresponding to the selected cutting switch between being displayed and non-displayed. The displayed paths divide the objects into a plurality of groups, while the non-displayed paths do not divide the objects.

The display module 12 further displays a message box having a confirmation button 243 for the user to confirm whether to group the objects according to the displayed paths. The second detection module 20b detects whether the confirmation button 243 is selected. When the second detection module 20b detects that the confirm button 243 is selected, the grouping module 14 groups the objects in each of the groups to form a grouping block.

In an embodiment, instead of automatically cutting a grouping block into sub-blocks as shown in FIGS. 4A-4C, the user can see a suggestion first and then confirm whether to cut a grouping block as suggested. For example, as shown in FIG. 24C, the display module 12 provides a suggestion by displaying at least one path in each blank interval area in the uppermost grouping block, wherein two paths are displayed beside each of the objects 2a, 2b and 2c.

The display module 12 also displays a plurality of cutting switches adjacent to the paths, wherein each cutting switch corresponds to one path. For example, the cutting switch 246 is adjacent to and corresponds to the leftmost path beside the object 2a. The detection modules 20 may include a detection module for detecting whether any one cutting switch is selected. When the detection module detects that any one cutting switch is selected, the display module 12 switches the path corresponding to the selected cutting switch between being displayed and non-displayed. The displayed paths divide the grouping block into sub-blocks, while the non-displayed paths do not divide the grouping block.

The display module 12 further displays a message box having a confirmation button 245 for the user to confirm whether to cut the grouping block according to the displayed paths. The second detection module 20b detects whether the confirmation button 245 is selected. When the second detection module 20b detects that the confirm button 245 is selected, the cutting module 16 cuts the grouping block into sub-blocks along each of the displayed paths.

Figure 25:
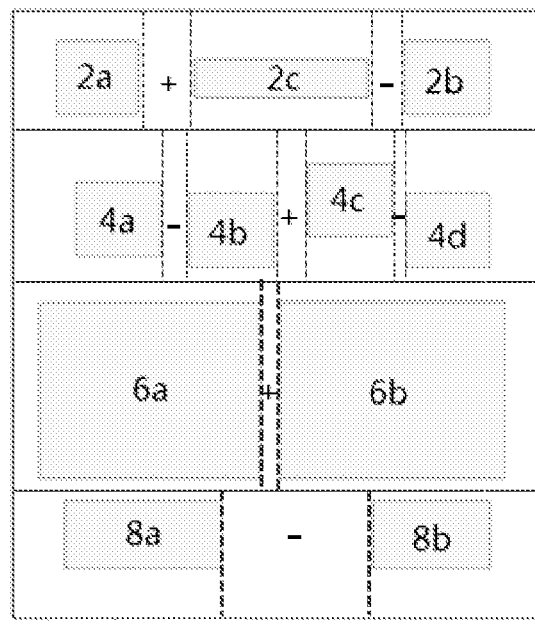
FIGS. 25-26B are schematic diagrams showing the arrangement of objects according to different widths of the display.
Figure 26A:
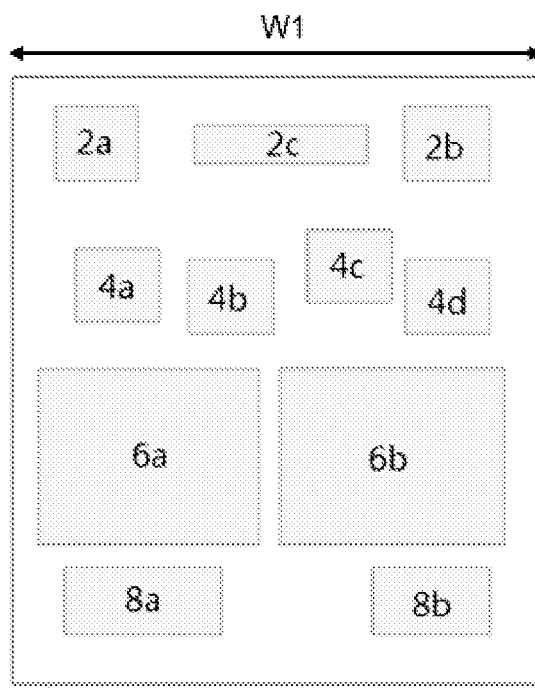
Figure 26B:
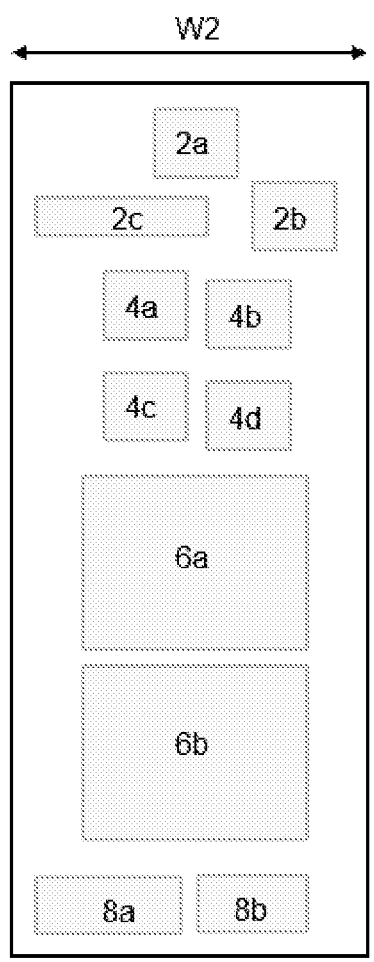

FIGS. 25-26B are schematic diagrams showing the arrangement of objects according to different widths of the display. In this embodiment, the setting module 18 may set each interval between two objects of the programmable user interface 100 as having a first display attribute (i.e., the non-wrap display attribute) or a second display attribute (i.e., the row-wrap display attribute). In addition, the display module 12 displays an attribute element in each interval, wherein the attribute element presents a first display state for representing the first display attribute of the corresponding interval or a second display state for representing the second display attribute of the corresponding interval. For example, as shown in FIG. 25, the interval between the objects 2a and 2c has the second display attribute, while the interval between the objects 2c and 2b has the first display attribute. Accordingly, the attribute element in the interval between the objects 2a and 2c presents the second display state (e.g., "+") for representing the second display attribute, while the attribute element in the interval between the objects 2c and 2b presents the first display state (e.g., "−") for representing the first display attribute. The detection modules 20 may include a detection module for detecting whether any one attribute element is selected. When the detection module detects that an attribute element in an interval is selected, the setting module 18 switches the interval between having the first display attribute and having the second display attribute, and the display module 12 switches the attribute element between presenting the first display state and presenting the second display state. The description code generation module 22 can automatically generate a description code corresponding to the objects adjacent to the intervals according to the first display attribute or the second display attribute.

The display attribute of an interval controls whether the two objects surrounding the interval are displayed in the same row or different rows when the display is narrow. The two object are arranged in the same row when the interval has the first display attribute and a first display displaying the programmable user interface 100 has a first width W1. The two object are arranged in two different rows when the interval has the second display attribute and a second display displaying the programmable user interface 100 has a second width W2, wherein the second width W2 is smaller than the first width W1. For example, as shown in FIG. 26A, when the first display has the larger width W1, the objects 2a-2c are displayed in the same row regardless of the display attributes of the intervals between them. On the other hand, as shown in FIG. 26B, when the second display has the smaller width W2, the objects 2a and 2c are displayed in two different rows because the interval between them has the second display attribute, while the objects 2c and 2b are still displayed in the same row because the interval between them has the first display attribute.

In another embodiment, the display module 12 may display the attribute elements corresponding to the intervals as attribute switches in the object attribute display area 36 instead of displaying the attribute elements in the intervals between objects.

The terms "first", "second", "third", etc., used in this specification do not imply an order between elements or steps. In short, modifiers such as "first", "second", "third", etc., in this specification and the appended claims are only used as reference words for different elements or steps, and are not intended to limit any function or to limit the chronological order.

Although the present disclosure has been disclosed by way of above embodiments, the embodiments are not intended to limit the present disclosure, and those skilled in the art will appreciate that changes and modifications may be made therein as long as those changes and modifications do not deviate from the spirit and the scope of the present disclosure. Therefore, the scope of the present disclosure should be construed according to the definitions in the appended claims.

What is claimed is:

1. A method for generating a description code of a user interface, comprising:
    displaying a programmable user interface having a first object and a second object;
    grouping the first object and the second object to form a grouping block, wherein the first object and the second object are in the grouping block;
    cutting the grouping block into a first sub-block and a second sub-block, wherein the first object is in the first sub-block and the second object is in the second sub-block;
    setting a first interval between the first object and the second object as having a first display attribute or a second display attribute;
    displaying a first attribute element together with the first object and the second object on the programmable user interface, wherein the first attribute element presents a first display state for representing the first display attribute or presents a second display state for representing the second display attribute;
    detecting whether the first attribute element displayed on the programmable user interface is selected;
    when the first attribute element displayed on the programmable user interface is detected as selected, switching the first interval between having the first display attribute and having the second display attribute and switching the first attribute element between presenting the first display state and presenting the second display state; and
    generating a first description code corresponding to the first object and the second object according to the first display attribute or the second display attribute after switching the first interval between having the first display attribute and having the second display attribute and after switching the first attribute element between presenting the first display state and presenting the second display state, wherein:
        the first object and the second object are arranged in a same row when the first interval has the first display attribute and a first display displaying the programmable user interface has a first width;
        the first object and the second object are arranged in different rows when the first interval has the second display attribute and a second display displaying the programmable user interface has a second width; and
        the second width is smaller than the first width.

2. The method according to claim 1, wherein the programmable user interface further has a third object, and the method further comprises:
    setting a second interval between the second object and the third object as having a third display attribute or a fourth display attribute;
    displaying a second attribute element together with the first attribute element on the programmable user interface, wherein the second attribute element presents a third display state for representing the third display attribute or presents a fourth display state for representing the fourth display attribute;
    detecting whether the second attribute element displayed on the programmable user interface is selected; and
    when the second attribute element displayed on the programmable user interface is detected as selected, switching the second interval between having the third display attribute and having the fourth display attribute and switching the second attribute element between presenting the third display state and presenting the fourth display state, wherein:
        the first object, the second object and the third object are arranged in the same row when the first interval has the first display attribute, the second interval has the fourth display attribute, and the first display displaying the programmable user interface has the first width; and
        the first object is arranged in a row and the second object and the third object are arranged in another row when the first interval has the first display attribute, the second interval has the fourth display attribute, and the second display displaying the programmable user interface has the second width.

3. The method according to claim 2, further comprising:
setting the first sub-block as having a fifth display attribute associated with a logical unit length of the first sub-block;
displaying a third attribute element together with the first sub-block on the programmable user interface, wherein the third attribute element presents a fifth display state for representing the fifth display attribute;
detecting whether the third attribute element displayed on the programmable user interface is selected;
when the third attribute element displayed on the programmable user interface is detected as selected, changing the fifth display attribute of the first sub-block to a sixth display attribute associated with the logical unit length of the first sub-block and changing the fifth display state presented by the third attribute element to a sixth display state, wherein the sixth display state is used to represent the sixth display attribute; and
generating a second description code corresponding to the first sub-block according to the sixth display attribute after changing the fifth display attribute of the first sub-block to the sixth display attribute associated with the logical unit length of the first sub-block.

4. The method according to claim 3, wherein the step of cutting the grouping block into the first sub-block and the second sub-block further comprises:
detecting whether the first interval exists between the first object and the second object, wherein the first interval is defined by a first edge of the first object and a second edge of the second object, wherein:
when the first interval between the first object and the second object is detected, cutting the grouping block into the first sub-block and the second sub-block along at least one path in the first interval.

5. The method according to claim 4, wherein the at least one path comprises a first path and a second path, the first path being adjacent to the first edge of the first object, the second path being adjacent to the second edge of the second object, and wherein the step of cutting the grouping block into the first sub-block and the second sub-block further comprises:
cutting the grouping block into the first sub-block, the second sub-block and a third sub-block along the first path and the second path, wherein the third sub-block is between the first sub-block and the second sub-block.

6. The method according to claim 3, wherein when the first sub-block is set as having the fifth display attribute, the logical unit length of the first sub-block is fixed, and when the fifth display attribute of the first sub-block is changed to the sixth display attribute, the logical unit length of the first sub-block changes adaptively according to a length of a display displaying the programmable user interface; or
when the first sub-block is set as having the fifth display attribute, the logical unit length of the first sub-block changes adaptively according to the length of the display displaying the programmable user interface, and when the fifth display attribute of the first sub-block is changed to the sixth display attribute, the logical unit length of the first sub-block is fixed.

7. A system for generating a description code of a user interface, comprising:
a display module configured to display a programmable user interface having a first object and a second object;
a grouping module configured to group the first object and the second object to form a grouping block, wherein the first object and the second object are in the grouping block;
a cutting module configured to cut the grouping block into a first sub-block and a second sub-block, wherein the first object is in the first sub-block and the second object is in the second sub-block;
a setting module configured to set a first interval between the first object and the second object as having a first display attribute or a second display attribute, wherein the display module is further configured to display a first attribute element together with the first object and the second object on the programmable user interface, wherein the first attribute element presents a first display state for representing the first display attribute or presents a second display state for representing the second display attribute;
a first detection module configured to detect whether the first attribute element displayed on the programmable user interface is selected, wherein when the first detection module detects that the first attribute element displayed on the programmable user interface is selected, the first interval is switched between having the first display attribute and having the second display attribute, and the first attribute element is switched between presenting the first display state and presenting the second display state;
a description code generation module configured to generate a first description code corresponding to the first object and the second object according to the first display attribute or the second display attribute after the first interval is switched between having the first display attribute and having the second display attribute and after the first attribute element is switched between presenting the first display state and presenting the second display state, wherein:
the first object and the second object are arranged in a same row when the first interval has the first display attribute and a first display displaying the programmable user interface has a first width;
the first object and the second object are arranged in different rows when the first interval has the second display attribute and a second display displaying the programmable user interface has a second width; and
the second width is smaller than the first width.

8. The system according to claim 7, wherein the programmable user interface further has a third object, and wherein:
the setting module is further configured to set a second interval between the second object and the third object as having a third display attribute or a fourth display attribute;
the display module is further configured to display a second attribute element together with the first attribute element on the programmable user interface, wherein the second attribute element presents a third display state for representing the third display attribute or presents a fourth display state for representing the fourth display attribute;
the first detection module is further configured to detect whether the second attribute element displayed on the programmable user interface is selected, wherein when the first detection module detects that the second attribute element displayed on the programmable user interface is selected, the second interval is switched between having the third display attribute and having the fourth display attribute, and the second attribute element is switched between presenting the third display state and presenting the fourth display state, wherein:

the first object, the second object and the third object are arranged in the same row when the first interval has the first display attribute, the second interval has the fourth display attribute, and the first display displaying the programmable user interface has the first width; and the first object is arranged in a row and the second object and the third object are arranged in another row when the first interval has the first display attribute, the second interval has the fourth display attribute, and the second display displaying the programmable user interface has the second width.

9. The system according to claim 8, wherein:

the setting module is further configured to set the first sub-block as having a fifth display attribute associated with a logic unit length of the first sub-block;

the display module is further configured to display a third attribute element together with the first sub-block on the programmable user interface, wherein the third attribute element presents a fifth display state for representing the fifth display attribute;

the first detection module is further configured to detect whether the third attribute element is selected, wherein when the first detection module detects that the third attribute element is selected, the setting module changes the fifth display attribute of the first sub-block to a sixth display attribute associated with the logic unit length of the first sub-block and changes the fifth display state presented by the third attribute element to a sixth display state, wherein the sixth display state is used to represent the sixth display attribute; and the description code generation module is configured to generate a second description code corresponding to the first sub-block according to the sixth display attribute associated with the logic unit length of the first sub-block.

10. The system according to claim 9, further comprising:

a second detection module configured to detect whether the first interval exists between the first object and the second object, wherein the first interval is defined by a first edge of the first object and a second edge of the second object, wherein:

when the second detection module detects the first interval between the first object and the second object, the cutting module is further configured to cut the grouping block into the first sub-block and the second sub-block along at least one path in the first interval.

11. The system according to claim 10, wherein the at least one path comprises a first path and a second path, the first path being adjacent to the first edge of the first object, the second path being adjacent to the second edge of the second object, and wherein:

the cutting module is further configured to cut the grouping block into the first sub-block, the second sub-block and a third sub-block along the first path and the second path; and the third sub-block is between the first sub-block and the second sub-block.

12. A non-transitory computer-readable storage medium for storing at least one program including a plurality of instructions that, when executed by at least one computer, generates a plurality of operations, wherein the plurality of operations comprises:

displaying a programmable user interface having a first object and a second object;

grouping the first object and the second object to form a grouping block, wherein the first object and the second object are in the grouping block;

cutting the grouping block into a first sub-block and a second sub-block, wherein the first object is in the first sub-block and the second object is in the second sub-block;

setting a first interval between the first object and the second object as having a first display attribute or a second display attribute;

displaying a first attribute element together with the first object and the second object on the programmable user interface, wherein the first attribute element presents a first display state for representing the first display attribute or presents a second display state for representing the second display attribute;

detecting whether the first attribute element displayed on the programmable user interface is selected;

when the first attribute element displayed on the programmable user interface is detected as selected, switching the first interval between having the first display attribute and having the second display attribute and switching the first attribute element between presenting the first display state and presenting the second display state; and generating a first description code corresponding to the first object and the second object according to the first display attribute or the second display attribute after switching the first interval between having the first display attribute and having the second display attribute and after switching the first attribute element between presenting the first display state and presenting the second display state, wherein:

the first object and the second object are arranged in a same row when the first interval has the first display attribute and a first display displaying the programmable user interface has a first width;

the first object and the second object are arranged in different rows when the first interval has the second display attribute and a second display displaying the programmable user interface has a second width; and the second width is smaller than the first width.

13. The non-transitory computer-readable storage medium according to claim 12, wherein the programmable user interface further has a third object, and the plurality of operations further comprises:

setting a second interval between the second object and the third object as having a third display attribute or a fourth display attribute;

displaying a second attribute element together with the first attribute element on the programmable user interface, wherein the second attribute element presents a third display state for representing the third display attribute or presents a fourth display state for representing the fourth display attribute;

detecting whether the second attribute element displayed on the programmable user interface is selected; and when the second attribute element displayed on the programmable user interface is detected as selected, switching the second interval between having the third display attribute and having the fourth display attribute and switching the second attribute element between presenting the third display state and presenting the fourth display state, wherein:

the first object, the second object and the third object are arranged in the same row when the first interval has the first display attribute, the second interval has the fourth display attribute, and the first display displaying the programmable user interface has the first width; and the first object is arranged in a row and the second object and the third object are arranged in another row when the first interval has the first display attribute, the second interval has the fourth display attribute, and the second display displaying the programmable user interface has the second width.

14. The non-transitory computer-readable storage medium according to claim 13, wherein the plurality of operations further comprises:

setting the first sub-block as having a fifth display attribute associated with a logical unit length of the first sub-block;

displaying a third attribute element together with the first sub-block on the programmable user interface, wherein the third attribute element presents a fifth display state for representing the fifth display attribute;

detecting whether the third attribute element displayed on the programmable user interface is selected;

when the third attribute element displayed on the programmable user interface is detected as selected, changing the fifth display attribute of the first sub-block to a sixth display attribute associated with the logical unit length of the first sub-block and changing the fifth display state presented by the third attribute element to a sixth display state, wherein the sixth display state is used to represent the sixth display attribute; and generating a second description code corresponding to the first sub-block according to the sixth display attribute after changing the fifth display attribute of the first sub-block to the sixth display attribute associated with the logical unit length of the first sub-block.

15. The non-transitory computer-readable storage medium according to claim 14, wherein the operation of cutting the grouping block into the first sub-block and the second sub-block further comprises:

detecting whether the first interval exists between the first object and the second object, wherein the first interval is defined by a first edge of the first object and a second edge of the second object, wherein:

when the first interval between the first object and the second object is detected, cutting the grouping block into the first sub-block and the second sub-block along at least one path in the first interval.

16. The non-transitory computer-readable storage medium according to claim 15, wherein the at least one path comprises a first path and a second path, the first path being adjacent to the first edge of the first object, the second path being adjacent to the second edge of the second object, and wherein the operation of cutting the grouping block into the first sub-block and the second sub-block further comprises:

cutting the grouping block into the first sub-block, the second sub-block and a third sub-block along the first path and the second path, wherein the third sub-block is between the first sub-block and the second sub-block.

\* \* \* \* \*